(12) United States Patent
Kubo et al.

(10) Patent No.: US 10,021,330 B2
(45) Date of Patent: Jul. 10, 2018

(54) SOLID-STATE IMAGE CAPTURING DEVICE INCLUDING DIVIDED COLUMN SIGNAL LINES

(71) Applicant: Panasonic Intellectual Property Management Co., Ltd., Osaka (JP)

(72) Inventors: Hiroshi Kubo, Osaka (JP); Hirohisa Ohtsuki, Hyogo (JP); Kunihiko Hara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/204,006

(22) Filed: Jul. 7, 2016

(65) Prior Publication Data

US 2016/0316166 A1 Oct. 27, 2016

Related U.S. Application Data

(63) Continuation of application No. PCT/JP2015/000053, filed on Jan. 8, 2015.

(30) Foreign Application Priority Data

Jan. 22, 2014 (JP) .................................. 2014-009795

(51) Int. Cl.
*H04N 5/374* (2011.01)
*H04N 5/3745* (2011.01)
(Continued)

(52) U.S. Cl.
CPC ........... *H04N 5/3742* (2013.01); *H04N 5/347* (2013.01); *H04N 5/357* (2013.01); *H04N 5/374* (2013.01);
(Continued)

(58) Field of Classification Search
None
See application file for complete search history.

(56) References Cited

U.S. PATENT DOCUMENTS

| 2010/0097510 | A1* | 4/2010 | Wada ................. H04N 5/37213 348/308 |
| 2010/0149392 | A1* | 6/2010 | Hara ..................... H04N 5/343 348/300 |
| 2015/0222830 | A1 | 8/2015 | Wada et al. |

FOREIGN PATENT DOCUMENTS

| JP | 2005-347932 | 12/2005 |
| JP | 2008-252935 | 10/2008 |

(Continued)

OTHER PUBLICATIONS

International Search Report of PCT application No. PCT/JP2015/000053 dated Mar. 24, 2015.

*Primary Examiner* — Mark T Monk
(74) *Attorney, Agent, or Firm* — McDermott Will & Emery LLP

(57) ABSTRACT

In a solid-state image capturing device, one or more vertical signal lines are disposed along one of columns of a pixel portion, and each of the vertical signal lines is divided into two parts between an upper region and a lower region of the pixel portion. Pixel signals output from a plurality of pixels of the one of the columns are read out to a plurality of column readout circuits through two or more parts of the vertical signal lines including the two parts of the one or more vertical signal lines disposed along the one of the columns. A division position of one vertical signal line among the vertical signal lines disposed in the pixel portion is different from a division position of another vertical signal line among the vertical signal lines in a row direction.

12 Claims, 24 Drawing Sheets

(51) Int. Cl.
*H04N 9/04* (2006.01)
*H04N 5/347* (2011.01)
*H04N 5/378* (2011.01)
*H04N 5/357* (2011.01)

(52) U.S. Cl.
CPC ......... *H04N 5/378* (2013.01); *H04N 5/37455* (2013.01); *H04N 9/045* (2013.01); *H04N 2209/042* (2013.01)

(56) References Cited

FOREIGN PATENT DOCUMENTS

| | | |
|---|---|---|
| JP | 2009-089132 | 4/2009 |
| JP | 2010-098516 | 4/2010 |
| JP | 2013-120956 | 6/2013 |

* cited by examiner

FIG. 7

|    | FIRST COLUMN CIRCUIT | SECOND COLUMN CIRCUIT | THIRD COLUMN CIRCUIT | FOURTH COLUMN CIRCUIT |
|----|----------------------|-----------------------|----------------------|-----------------------|
| 1H | n+4 ROW (Gr)         | n+7 ROW (B)           | n+6 ROW (Gr)         | n+9 ROW (B)           |
| 2H | n+2 ROW (Gr)         | n+5 ROW (B)           | n+8 ROW (Gr)         | n+11 ROW (B)          |
| 3H | n ROW (Gr)           | n+3 ROW (B)           | n+10 ROW (Gr)        | n+13 ROW (B)          |
| .. | ..                   | ..                    | ..                   | ..                    |

FIG. 9

|  | FIRST COLUMN CIRCUIT | SECOND COLUMN CIRCUIT | THIRD COLUMN CIRCUIT | FOURTH COLUMN CIRCUIT |
|---|---|---|---|---|
| 1H | n+4 ROW (Gr) | n+7 ROW (B) | n+6 ROW (Gr) | n+9 ROW (B) |
| 2H | n+2 ROW (Gr) | n+5 ROW (B) | n+8 ROW (Gr) | n+11 ROW (B) |
| 3H | n ROW (Gr) | n+3 ROW (B) | n+10 ROW (Gr) | n+13 ROW (B) |
| MIX-TURE | (n+4)ROW +(n+2)ROW +nROW (Gr) | (n+7)ROW +(n+5)ROW +(n+3)ROW (B) | (n+6)ROW +(n+8)ROW +(n+10)ROW (Gr) | (n+9)ROW +(n+11)ROW +(n+13)ROW (B) |
| : | : | : | : | : |

FIG. 18

|     | FIRST COLUMN CIRCUIT | SECOND COLUMN CIRCUIT | THIRD COLUMN CIRCUIT | FOURTH COLUMN CIRCUIT |
|-----|----------------------|-----------------------|----------------------|-----------------------|
| 1H  | n+4 ROW (Gr)         | n+7 ROW (B)           | n+6 ROW (Gr)         | n+9 ROW (B)           |
| 2H  | READOUT OF R/Gb PIXELS |||                                                          |
| 3H  | n+2 ROW (Gr)         | n+5 ROW (B)           | n+8 ROW (Gr)         | n+11 ROW (B)          |
| 4H  | READOUT OF R/Gb PIXELS ||||
| 5H  | n ROW (Gr)           | n+3 ROW (B)           | n+10 ROW (Gr)        | n+13 ROW (B)          |
| 6H  | READOUT OF R/Gb PIXELS ||||
| :   | :                    | :                     | :                    | :                     |

FIG. 20

|  | FIRST COLUMN CIRCUIT | SECOND COLUMN CIRCUIT | THIRD COLUMN CIRCUIT | FOURTH COLUMN CIRCUIT |
|---|---|---|---|---|
| 1H | n+4 ROW (Gr) | n+7 ROW (B) | n+6 ROW (Gr) | n+9 ROW (B) |
| 2H | n+2 ROW (Gr) | n+5 ROW (B) | n+8 ROW (Gr) | n+11 ROW (B) |
| 3H | n ROW (Gr) | n+3 ROW (B) | n+10 ROW (Gr) | n+13 ROW (B) |
| MIX-TURE | (n+4)ROW +(n+2)ROW +nROW (Gr) | (n+7)ROW +(n+5)ROW +(n+3)ROW (B) | (n+6)ROW +(n+8)ROW +(n+10)ROW (Gr) | (n+9)ROW +(n+11)ROW +(n+13)ROW (B) |
| 4H | READOUT OF R/Gb PIXELS | | | |
| 5H | READOUT OF R/Gb PIXELS | | | |
| 6H | READOUT OF R/Gb PIXELS | | | |
|  | MIXTURE OF R/Gb PIXELS | | | |
| ⋮ | ⋮ | ⋮ | ⋮ | ⋮ |

SOLID-STATE IMAGE CAPTURING DEVICE INCLUDING DIVIDED COLUMN SIGNAL LINES

RELATED APPLICATIONS

This application is a Continuation of International Application No. PCT/JP2015/000053, filed on Jan. 8, 2015, which in turn claims priority from Japanese Patent Application No. 2014-009795, filed on Jan. 22, 2014, the contents of all of which are incorporated herein by reference in their entireties.

BACKGROUND

1. Technical Field

The present disclosure relates to a solid-state image capturing device.

2. Description of the Related Art

Recently, a CMOS image sensor, which has excellent features of high speed and high sensitivity, is used for image capturing devices of large numbers of single-lens reflex digital cameras and fixed-lens digital cameras. The CMOS image sensor includes: a pixel portion in which pixels performing photoelectric conversion are arranged two-dimensionally; a column ADC (Analog-to-Digital Converter) circuit that performs digital conversion for pixel signals read out from the pixel portion; and a digital balancer that averages the digitized pixel signals in response to a drive mode. As the drive mode, there are: a full scan mode for use in capturing a static image; and a mixture mode for capturing a monitor image for use in a live view (electronic finder) and the like. In the full scan mode, the pixel signals are output independently of one another without being averaged in the digital balancer, and in the mixture mode, a plurality of the pixel signals are added to one another in the digital balancer, and are then output. Note that a number of base units of the column ADC is equal to or more than a number of columns In general, when a number of the pixels which compose the pixel portion is increased, resolution of a captured image is enhanced. Accordingly, a number of pixels of the image sensor has been as huge as several ten millions. Moreover, a quantity of light input to the pixel portion is increased as an area of the pixel portion is larger. Accordingly, as the pixel portion has a larger area, the pixel portion is more suitable for enhancement of image quality. Therefore, a demand for a camera using a sensor with a large area of the pixel portion has been increasing. For example, in a camera with a format of a 35 mm full size, the area of the pixel portion is 36 mm×24 mm. If the huge number of pixels are arranged on such a large area, then it takes a longer time to capture an image since a load on readout lines is increased and a number of signals to be read out is increased. Such a problem as described above has occurred.

For this problem, FIG. 1 of Unexamined Japanese Patent Publication No. 2010-98516 illustrates enhancement of speed, which is brought by division of vertical signal lines on a center of the pixel portion. Specifically, in a configuration disclosed in Unexamined Japanese Patent Publication No. 2010-98516, on an upper half and lower half of the pixel portion, the pixel signals are read out simultaneously by using two vertical signal lines (one vertical signal line before the division), whereby a load on each of the vertical signal lines is reduced. In such a way, in the configuration concerned, the readout can be accelerated. Note that the number of base units of the column ADC is equal to or more than double the number of columns Moreover, FIG. 5 of Unexamined Japanese Patent Publication No. 2005-347932 illustrates a configuration of enhancing such a readout speed by disposing two vertical signal lines in each column in parallel. Specifically, in the configuration disclosed in Unexamined Japanese Patent Publication No. 2005-347932, the readout speed can be enhanced by simultaneously reading out signals in odd-number rows and even-number rows by using two vertical signal lines. Note that the number of base units of the column ADC is equal to or more than double the number of columns

SUMMARY

A solid-state image capturing device according to an aspect of the present disclosure includes: a pixel portion in which a plurality of pixels outputting pixel signals corresponding to quantities of received light are arrayed in a matrix; and a plurality of column readout circuits which are disposed in an upper part and a lower part of a periphery of the pixel portion and read out the pixel signals output from the pixel portion. One or more vertical signal lines are disposed along one of columns of the pixel portion, and each of the vertical signal lines is divided into two parts between an upper region and a lower region of the pixel portion. The pixel signals output from the plurality of pixels of the one of the columns are read out to the plurality of column readout circuits through two or more parts of the vertical signal lines including the two parts of the one or more vertical signal lines disposed along the one of the columns A division position of one vertical signal line among the vertical signal lines disposed in the pixel portion is different from a division position of another vertical signal line among the vertical signal lines in a row direction.

As described above, the vertical signal lines are divided, and the pixel signals output from the pixels of each column are read out through two or more vertical signal lines, whereby a time required to read out the pixel signals can be reduced. That is to say, the solid-state image capturing device becomes capable of the high-speed readout. Moreover, the division position of one vertical signal line and the division position of another vertical signal line are different from each other in the row direction, whereby the occurrence of the moire in the case of mixing and reading out the plurality of pixel signals output from the plurality of pixels can be suppressed in comparison with the case where these vertical signal lines are divided at the same position in the row direction. That is to say, it becomes possible to capture the monitor image with high image quality. Hence, the solid-state image capturing device according to an aspect of the present disclosure makes it possible to capture the monitor image with high image quality while enabling the high-speed readout.

For example, two or more vertical signal lines are disposed along one of the columns of the pixel portion, and the pixel signals output from the plurality of pixels of the one of the columns are read out to the plurality of column readout circuits through two or more parts of the vertical signal lines disposed along the one of the columns A division position of one vertical signal line among the two or more vertical signal lines disposed in the one of the columns may be different from a division position of another vertical signal line among the two or more vertical signal lines disposed along the one of the columns in the row direction.

In such a way, even in a case where the plurality of pixels corresponding to colors different from each other are disposed in the same column, the occurrence of the moire in the case of mixing and reading out the plurality of pixel signals output from the plurality of pixels can be suppressed.

Moreover, for example, a plurality of vertical signal line sets are disposed along the one of the columns of the pixel portion, each of the plurality of vertical signal line sets being composed of a plurality of the vertical signal lines in which division positions are different from each other in the row direction, and the pixel signals output from the plurality of pixels of the one of the columns may be read out to the plurality of column readout circuits through the plurality of vertical signal line sets disposed along the one of the columns In such a way, pixel signals of pixels corresponding to one vertical signal line set among the plural vertical signal line sets, which are disposed in the same column, and pixel signals of pixels corresponding to another vertical signal line set of the plural vertical signal lines sets can be read out simultaneously. Accordingly, the solid-state image capturing device becomes capable of performing the readout at higher speed.

Moreover, for example, two pixels adjacent to each other in a column direction may share a selection transistor for outputting the pixel signals, the pixel signals output from the plurality of pixels of the one of the columns may be read out through one or more vertical signal lines disposed along another column adjacent to the one of the columns, and a division position of the one or more vertical signal lines disposed in the one of the columns may be different from a division position of the one or more vertical signal lines disposed in the another column adjacent to the one of the columns in the row direction.

That is to say, two pixels adjacent to each other in the column direction have one output. In such a way, a pixel constituent is shared by two pixels adjacent to each other and a photodiode area can be increased. Hence, the pixel signal (sensitivity) with respect to the quantity of light received by the solid-state image capturing device can be enhanced.

Moreover, for example, one vertical signal line of the vertical signal lines shared by the one of the columns and the another column adjacent to the one of the columns may be disposed along the one of the columns in the pixel portion, and a division position of the one vertical signal line disposed along the one of the columns is different from a division position of another vertical signal line along the another column adjacent to the one of the columns in the row direction.

Moreover, for example, the solid-state image capturing device may have: a full scan mode that is a drive mode of reading out the pixel signals of all of the pixels independently of one another; and a mixture mode that is a drive mode of mixing and reading out the plurality of the pixel signals output from the plurality of pixels.

In such a way, the solid-state image capturing device can strike a balance between the full scan mode that makes it possible to obtain an image with high resolution at high speed and the mixture mode that makes it possible to obtain an image with a little moire at high speed.

Moreover, for example, in the pixel portion, red pixels, blue pixels, and green pixels are arranged in a Bayer matrix, the red pixels outputting the pixel signals based on red light, blue pixels outputting the pixel signals based on blue light, and green pixels outputting the pixel signals based on green light. The vertical signal lines may be divided at positions corresponding to a positional relationship between centers of gravity of already mixed pixel signals output from a plurality of rows including the red pixels and centers of gravity of the already mixed pixel signals output from a plurality of rows including the blue pixels.

Moreover, for example, the vertical signal lines may be divided at positions where the centers of gravity of the already mixed pixel signals output from the plurality of rows including the red pixels and the centers of gravity of the already mixed pixel signals output from the plurality of rows including the blue pixels are located at an equal pitch.

In such a way, the solid-state image capturing device can further suppress the occurrence of the moire in the mixture mode.

The solid-state image capturing device according to the present disclosure makes it possible to capture the monitor image with high image quality while enabling the high-speed readout.

BRIEF DESCRIPTION OF THE DRAWINGS

FIG. 7 is a table showing accesses of pixels in respective horizontal periods of a full scan mode of the solid-state image capturing device in the first exemplary embodiment;

FIG. 9 is a table showing accesses of the pixels in respective horizontal periods of the mixture mode of the solid-state image capturing device in the first exemplary embodiment;

FIG. 18 is a table showing accesses of pixels in respective horizontal periods of a full scan mode of the solid-state image capturing device in the third exemplary embodiment;

FIG. 20 is a table showing accesses of the pixels in respective horizontal periods of a mixture mode of the solid-state image capturing device in the third exemplary embodiment;

DETAILED DESCRIPTION OF EMBODIMENT

First, a description is made of a problem in the conventional technology. Such a configuration as disclosed in Unexamined Japanese Patent Publication No. 2010-98516, in which the vertical signal lines are divided on the center of the pixel portion, and such a configuration as disclosed in Unexamined Japanese Patent Publication No. 2005-347932, in which two vertical signal lines are disposed in parallel in each column, are combined with each other, whereby further enhancement of the readout speed can be expected.

Here, as mentioned above, in the case where the solid-state image capturing device drives in the mixture mode, the pixel signals output from the plurality of pixels are added to one another, whereby mixed signals for use in the monitor image are obtained.

However, in such a configuration in which the configuration disclosed in Unexamined Japanese Patent Publication No. 2010-98516 and the configuration disclosed in Unexamined Japanese Patent Publication No. 2005-347932 are combined with each other, it is apprehended that the image quality of monitor image that is based on the mixed signals may be deteriorated. That is to say, there is a problem that the monitor image cannot be captured with high quality.

The present disclosure has been made in consideration of the above-described problem. The present disclosure provides a solid-state image capturing device capable of capturing the monitor image with high quality while enabling high-speed readout.

(Knowledge as Base of the Present Disclosure)

Figure 21:
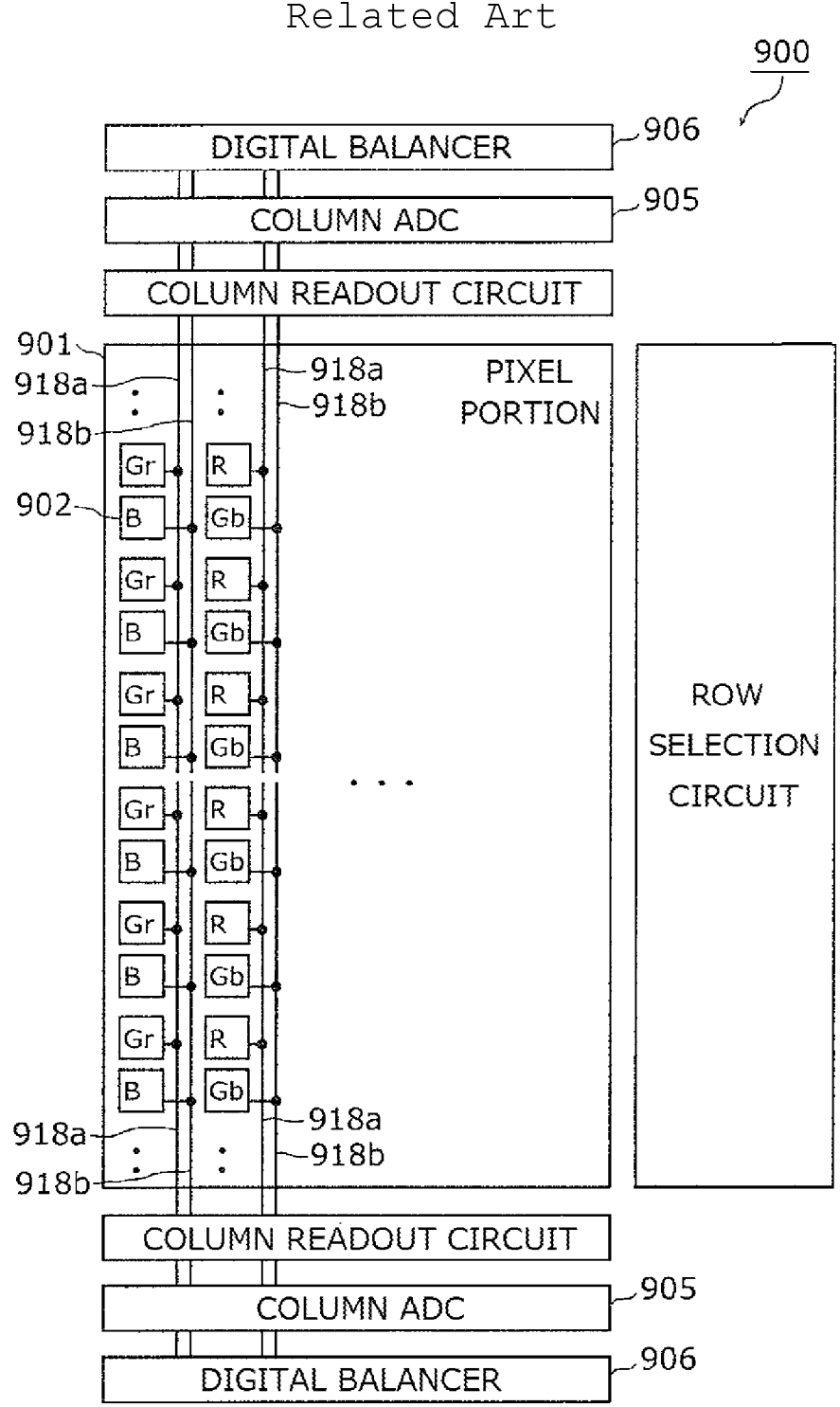
FIG. 21 is a block diagram showing an overall configuration of a solid-state image capturing device in a comparative example.

The inventors of the present disclosure have found out that there occurs such a problem as follows with regard to the conventional solid-state image capturing device described in the section of "Description of the Related Art". A solid-state image capturing device, which has a configuration applied simultaneously with the configuration disclosed in Unexamined Japanese Patent Publication No. 2010-98516 and the configuration disclosed in Unexamined Japanese Patent Publication No. 2005-347932, is described below as a solid-state image capturing device of a comparative example with the present disclosure. FIG. 21 is a block diagram showing an overall configuration of a solid-state image capturing device in a comparative example.

As shown in FIG. 21, in solid-state image capturing device 900 according to the comparative example, two vertical signal lines 918a, 918b are disposed in parallel in each of columns of pixel portion 901, and in addition, respective vertical signal lines 918a, 918b are divided into upper and lower regions on a center of pixel portion 901. In such a way, in comparison with the conventional solid-state image capturing device, solid-state image capturing device 900 according to the comparative example can read out pixel signals of four columns simultaneously, and accordingly, can realize a further acceleration. Note that the number of base units of the column ADC is equal to or more than four times the number of columns.

Figure 22:
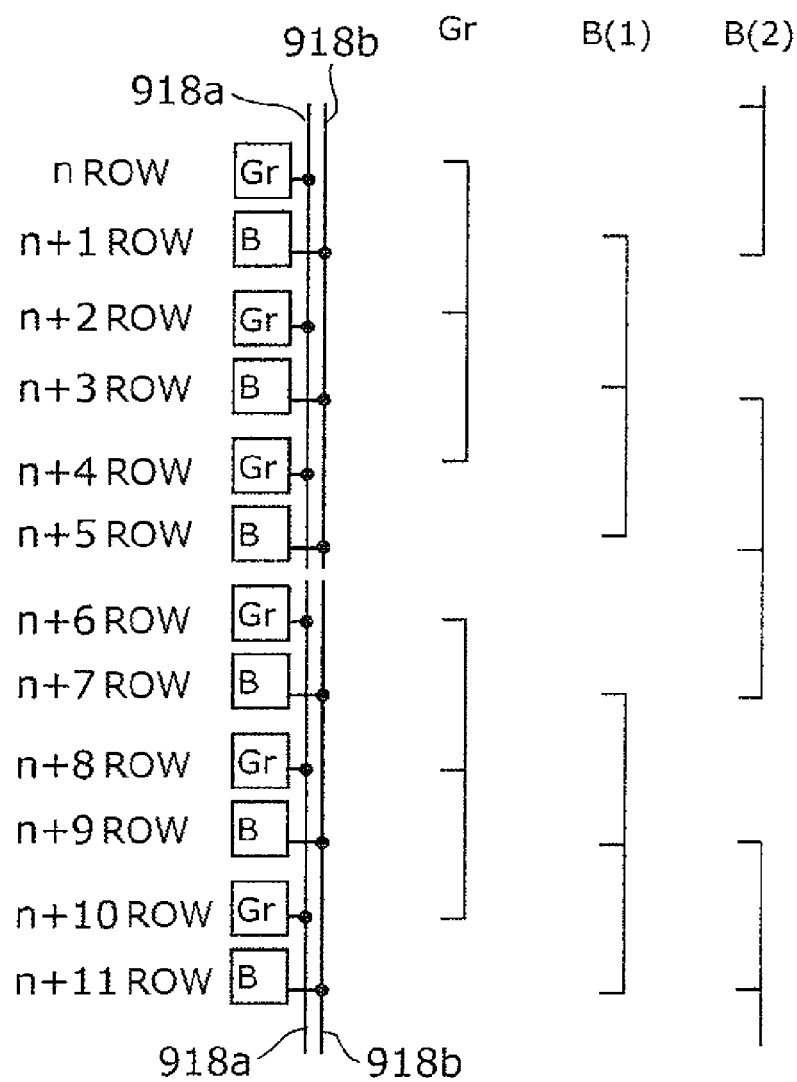
FIG. 22 is a diagram showing connections between pixels and vertical signal lines in one column (Gr/B column) of a pixel portion of the solid-state image capturing device and combinations of mixed rows in the mixture mode in the comparative example.

As a drive mode of an image sensor for a single-lens reflex digital camera, a mixture mode is essential in addition to a full scan mode. Here, for example, a case of performing vertical mixture of three pixels is considered. FIG. 22 is a diagram showing connections between pixels 902 and vertical signal lines 918a, 918b in one column (Gr/B column) of pixel portion 901 of solid-state image capturing device 900 and combinations of mixed rows in the mixture mode in the comparative example.

In solid-state image capturing device 900 according to the comparative example, with regard to mixture of combinations of Gr pixels and B(1) pixels, which are shown in FIG. 22, mixed signals, each of which is of three rows, are obtained by simple signal processing in digital balancer 906 that receives an output of column ADC 905. However, in this combination, centers of gravity of Gr and centers of gravity of B are not located at an equal pitch, and accordingly, moire occurs as a problem. Meanwhile, mixture of combinations of the Gr pixels and B(2) pixels, which is suitable for improvement of the moire, cannot be executed since mixture of an (n+3) row, an (n+5) row, and an (n+7) row is processing across vertical signal lines 918a, 918b, which are divided into the upper and lower regions.

That is to say, in comparison with the conventional solid-state image capturing device, in solid-state image capturing device 900 according to the comparative example, the acceleration of the readout of all pixels can be realized by four vertical signal lines 918a, 918b formed in such a manner that two vertical signal lines 918a, 918b are divided. However, there is a problem that a mixture mode with high image quality, in which the moire is suppressed, cannot be realized.

In order to solve such a problem as described above, a solid-state image capturing device according to an aspect of the present disclosure includes: a pixel portion in which a plurality of pixels outputting pixel signals corresponding to quantities of received light are arrayed in a matrix; and a plurality of column readout circuits which are disposed in an upper part and a lower part of a periphery of the pixel portion and read out the pixel signals output from the pixel portion, wherein one or more vertical signal lines are disposed in one of columns of the pixel portion, each of the vertical signal lines is divided into two parts between an upper region and a lower region of the pixel portion, the pixel signals output from the plurality of pixels of the one of the columns are read out to the plurality of column readout circuits through two or more parts of the vertical signal lines including the two parts of the one or more vertical signal lines disposed in the one of the columns, and a division position of one vertical signal line among the vertical signal lines disposed in the pixel portion is different from a division position of another vertical signal line among the vertical signal lines in a row direction.

In such a way, in accordance with this aspect, it becomes possible to capture the monitor image with high quality while enabling the high-speed readout. Specifically, the mixture mode with high image quality, in which the moire is suppressed, can be realized while enabling the acceleration of the readout of all pixels. That is to say, it becomes possible to capture a still image and a monitor image with high quality and at high speed.

A description is made below in detail of solid-state image capturing devices according to exemplary embodiments of the present disclosure with reference to the drawings. Note that the following exemplary embodiments illustrate a specific example of the present disclosure, and numeric values, shapes, materials, constituents, arrangement positions and connection forms of the constituents and the like are merely examples, and do not limit the present disclosure.

First Exemplary Embodiment

Figure 1:
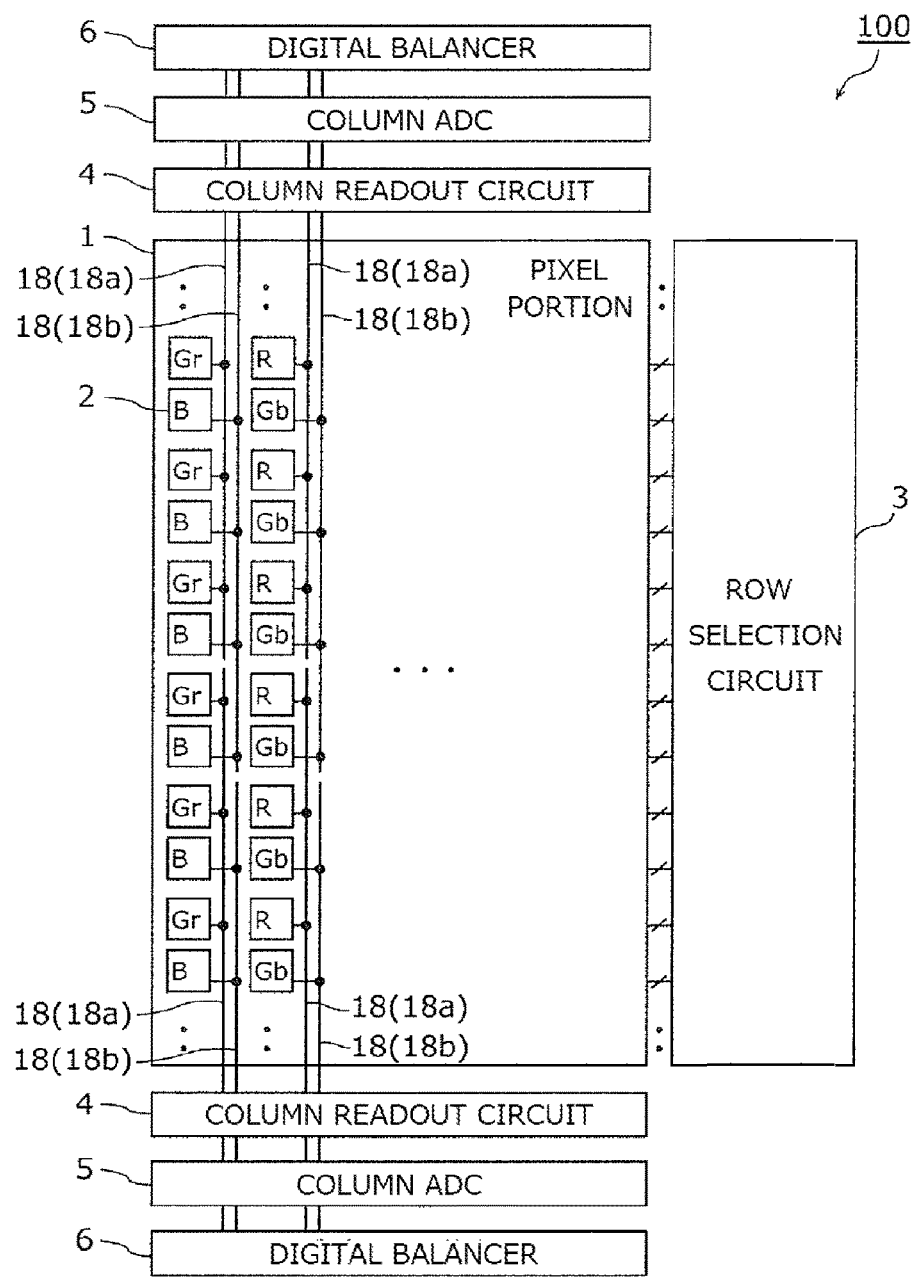
FIG. 1 is a block diagram showing an overall configuration of a solid-state image capturing device in a first exemplary embodiment.

First, a description is made of a configuration of the solid-state image capturing device according to the first exemplary embodiment of the present disclosure with reference to FIG. 1. FIG. 1 is a block diagram showing an overall configuration of the solid-state image capturing device in the first exemplary embodiment of the present disclosure.

As shown in FIG. 1, solid-state image capturing device 100 according to this exemplary embodiment includes: pixel portion 1; row selection circuit 3; column readout circuits 4; column ADCs 5; and digital balancers 6. Column readout circuits 4, column ADCs 5, and digital balancers 6 are disposed one set by one set in an upper part and a lower part of a periphery of pixel portion 1. Note that the following description is made on a definition that an up-and-down direction (that is, an up-and-down direction of a sheet surface) is an extended direction of vertical signal lines 18a, 18b. Moreover, the description is made on a definition that, in a similar way to the up-and-down direction, a row direction is the extended direction of vertical signal lines 18a, 18b (that is, the up-and-down direction of a sheet surface), and the description is made on a definition that a column direction is a direction (that is, a right-and-left direction of the sheet surface) perpendicular to the extended direction of vertical signal lines 18a, 18b. That is to say, the description is made on a definition that the row direction is an arranging direction of pixel rows, and that the column direction is an arranging direction of pixel columns Solid-state image capturing device 100 has: a full scan mode that is a drive mode of reading out pixel signals of all of pixels 2 independently of one another; and a mixture mode that is a drive mode of mixing and reading out a plurality of pixel signals output from a plurality of pixels 2. That is to say, solid-state image capturing device 100 includes: the full scan mode for use in capturing a still image by a camera; and the mixture mode used for a monitor image of the camera. The mixture mode is, for example, mixing signals for three pixels arrayed vertically and three pixels arrayed horizontally.

Specifically, in the full scan mode, solid-state image capturing device 100 outputs the pixel signals to an outside without performing processing of digital balancers 6 for the pixel signals. In such a way, the camera or the like, which includes solid-state image capturing device 100 as a chip for example, can obtain a full pixel image suitable for a still image. Meanwhile, in the mixture mode, solid-state image capturing device 100 reads out the pixel signals and implements digital conversion for the readout pixel signals, and thereafter, holds the digital pixel signals in digital balancers 6. Thereafter, after such processing is repeated, the pixel signals held by digital balancer 6 are averaged, whereby signals, each of which is formed by mixing a plurality of the pixel signals with one another, are obtained. Then, the mixed signals are output to the outside of solid-state image capturing device 100. In such a way, the camera or the like, which includes solid-state image capturing device 100, can obtain a mixed image suitable for a monitor image for use in a live view (electronic finder).

A description is made below in detail of respective constituents provided in solid-state image capturing device 100.

Pixel portion 1 is a capture region in which pixels 2 performing photoelectric conversion are arranged two-dimensionally. Specifically, in pixel portion 1, in a Bayer matrix, there are arranged: R pixels (red pixels) which output the pixel signals based on red light; B pixels (blue pixels) which output the pixel signals based on blue light; and Gr pixels and Gb pixels (green pixels) which output the pixel signals based on green light. Hereinbelow, in a case where it is not particularly necessary to distinguish the R pixels, the B pixels, the Gr pixels and the Gb pixels from one another, these pixels are simply referred to as pixels 2 in some case. Respective pixels 2 output the pixel signals, which correspond to quantities of received light, by photoelectric conversion.

FIG. 1 illustrates an example of 24 pixels 2 which are arrayed in a two-dimensional 2×12 matrix; however, an actual total number of the pixels is several millions or more. Two vertical signal lines 18a, 18b are disposed in parallel in each of the columns, and respective vertical signal lines 18a, 18b are divided into upper and lower parts, and become totally four vertical signal lines 18a, 18b. Moreover, a division position of vertical signal line 18b is shifted from a division position of vertical signal line 18a by two rows. Pixels 2 of each column are electrically connected alternately to each of two vertical signal lines 18a, 18b. Note that pixel portion 1 will be described later in detail. Moreover, hereinafter, in a case where it is not particularly necessary to distinguish vertical signal line 18a and vertical signal line 18b from each other, these vertical signal lines are simply referred to as vertical signal lines 18 in some case.

Here, "vertical signal lines 18 are divided" stands for a state where parts of vertical signal lines 18 are not electrically connected with each other, and includes not only a configuration in which the parts of vertical signal lines 18 are physically spaced apart from each other, but also a configuration in which the parts of vertical signal lines 18 do not electrically conduct to each other. That is to say, for example, a fact that vertical signal lines 18a are divided also includes a configuration in which wires forming vertical signal line 18a are physically spaced apart from each other, and a configuration in which the wires forming vertical signal line 18a do not electrically conduct to each other by a composition of the wires, circuit elements and the like.

Row selection circuit 3 includes three control lines, which are SEL, RST and TRAS, for each of lateral rows. Row selection circuit 3 controls reset (initialization), read (readout), and line select (row selection) per row for each of pixels 2 of pixel portion 1.

Base units of column readout circuits 4 are arrayed in the column direction, and column readout circuits 4 read out the pixel signals per row from pixel portion 1, remove fixed pattern noise components generated in pixels 2, and hold the pixel signals from which the fixed pattern noise components are removed. The base units of column readout circuits 4 are provided two by two per column, and respective vertical signal lines 18a, 18b are electrically connected to the respective base units. Note that column readout circuits 4 will be described later in detail.

Base units of column ADCs 5 are arrayed in the column direction, and column ADCs 5 convert the analog pixel signals, which are held per row in column readout circuits 4, into the digital pixel signals. The base units of column ADCs 5 are provided two by two per column. Note that column ADCs 5 will be described later in detail.

Base units of digital balancers 6 are arrayed in the column direction, and digital balancers 6 hold the pixel signals which are output data of column ADCs 5, and perform averaging processing for the plurality of pixel signals. However, as mentioned above, digital balancers 6 do not perform the averaging processing in the full scan mode. That is to say, digital balancers 6 do not execute the averaging processing in the full scan mode, and execute the averaging processing in the mixture mode. Base units of digital balancers 6 are provided two by two per column.

Figure 2:
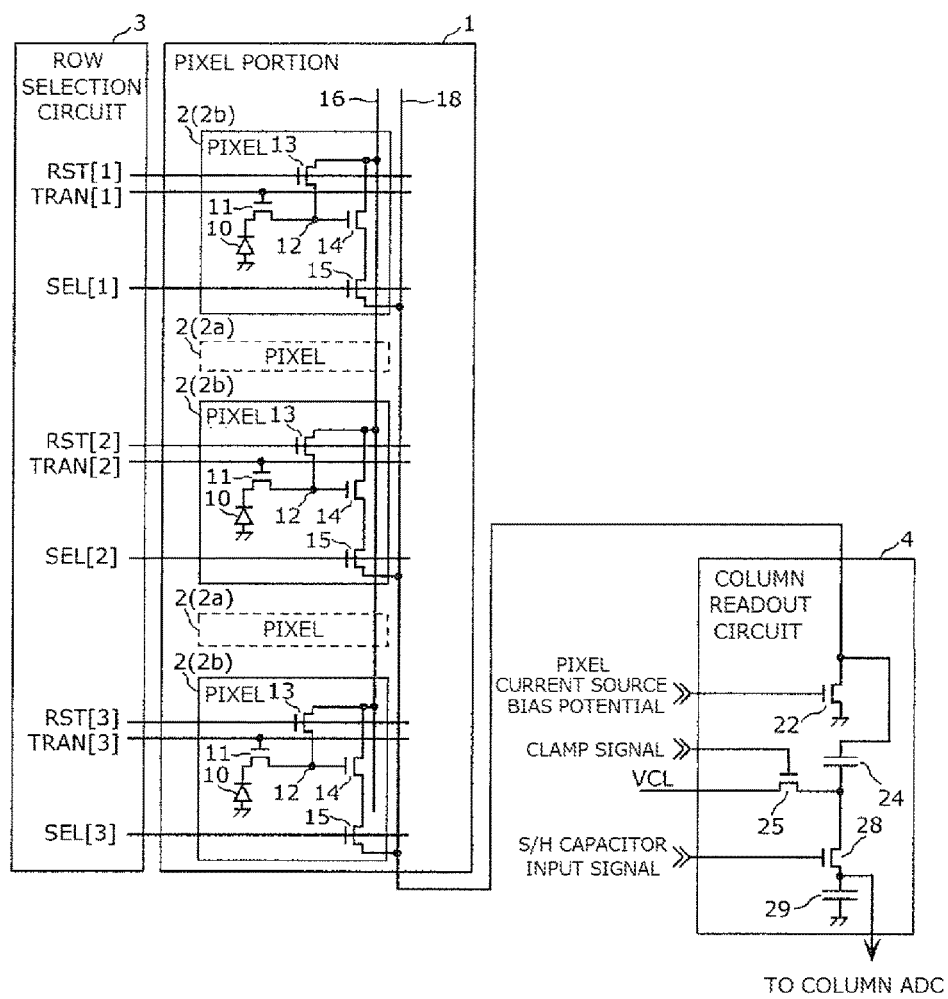
FIG. 2 is a circuit diagram showing detailed configurations of a pixel portion and a column readout circuit of the solid-state image capturing device in the first exemplary embodiment.

Next, a description is made in detail of pixel portion 1 and each of column readout circuits 4 with reference to FIG. 2. FIG. 2 is a circuit diagram showing detailed configurations of pixel portion 1 and column readout circuit 4 of solid-state image capturing device 100 in the first exemplary embodiment. Note that, in FIG. 2, the configuration of pixel 2a that is pixel 2 electrically connected to one of two vertical signal lines 18 disposed in the same column is omitted, and the configuration of pixel 2b that is pixel 2 electrically connected to the other one thereof is illustrated in detail; however, the configuration of pixel 2a and the configuration of pixel 2b are the same except that vertical signal lines 18 electrically connected to pixels 2a, 2b are different from each other.

As shown in FIG. 1 and FIG. 2, in pixel portion 1, the plurality of pixels 2 which output the pixel signals corresponding to the quantities of received light are arrayed in matrix. Specifically, each of pixels 2 outputs a reset voltage and a read voltage to corresponding vertical signal line 18. The reset voltage is obtained by amplifying an initialization-time voltage supplied thereto through power supply line 16. The read voltage is obtained by amplifying a readout-time voltage. Moreover, pixel 2 includes: photodiode (PD) 10 that performs photoelectric conversion for incident light and outputs charges;

floating diffusion (FD) 12 that accumulates the charges generated by PD 10 and outputs the accumulated charges as a voltage signal; reset transistor 13 that resets the voltage indicated by FD 12 to an initial voltage (here, VDD); transfer transistor 11 that supplies FD 12 with the charges output by PD 10; amplification transistor 14 that outputs a voltage changed following the voltage indicated by FD 12; and selection transistor 15 that connects the output of amplification transistor 14 to vertical signal line 18 upon receiving line selection signals (any of SEL[1] to SEL[3] in FIG. 2) from row selection circuit 3.

A function of each of column readout circuits 4 is to output, to column ADC 5, a signal indicating a difference between the reset voltage and the read voltage, which are output from pixel 2, after temporarily holding the signal. Base units of column readout circuit 4 are disposed one by one in respective vertical signal lines 18. Each of the base units includes: pixel current source transistor 22 that generates a current for supplying vertical signal line 18 with the output of amplification transistor 14 of each pixel 2; clamp capacitor 24 (capacitance value Ccl) that receives the output from pixel 2 and obtains the difference between the reset voltage and the read voltage, that is, the pixel signal; clamp transistor 25 in which a gate is supplied with a clamp signal, clamp transistor 25 serving for setting a terminal potential on an S/H capacitor 29 side of clamp capacity 24 to clamp potential VCL; S/H capacitor 29 (capacitance value Csh) in which a gate is supplied with an S/H capacitor input signal, S/H capacitor 29 temporarily holding the pixel signal; and S/H capacitor input transistor 28 that inputs a signal to S/H capacitor 29. That is to say, pixel current source transistor 22 operates as a source follower amplifier (pixel source follower) together with amplification transistor 14 of pixel 2.

Here, at determined timing, each pixel 2 is supplied with a pixel reset signal (RST), a charge transfer signal (TRAN), and a row selection signal (SEL), column readout circuit 4 is supplied with the clamp signal and the S/H capacitor input signal, and the transistors individually corresponding to these control signals are opened and closed (turned on and off).

Figure 3:
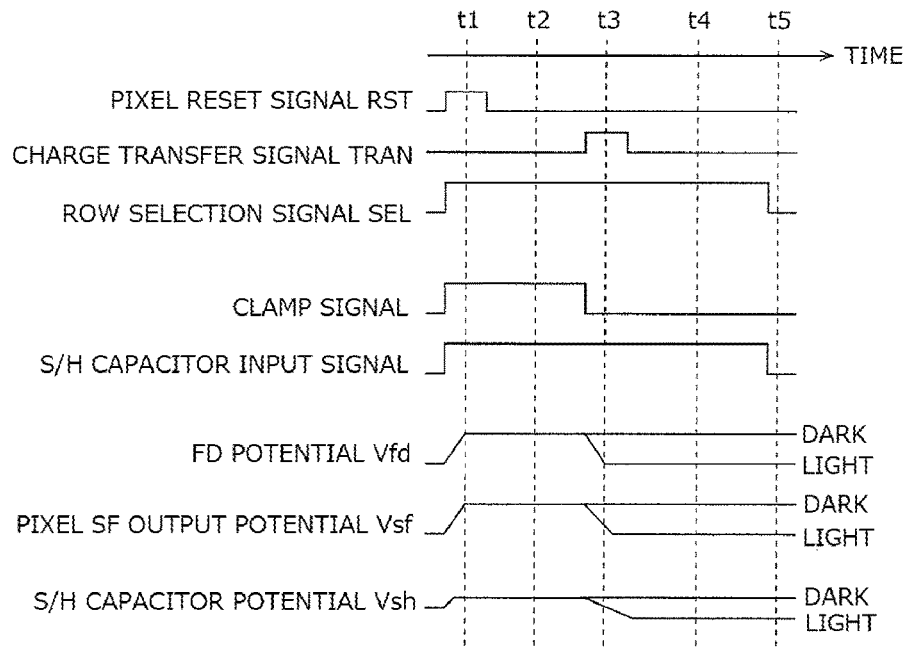
FIG. 3 is a chart showing pieces of timing of respective control signals regarding readout of pixel signals of the solid-state image capturing device in the first exemplary embodiment.

Next, a description is made of an operation of solid-state image capturing device 100, which is configured as described above, with reference to FIG. 3. Specifically, a description is made of a signal readout operation from pixel 2, which is one of basic operations composing a capturing operation of a whole of solid-state image capturing device 100 according to this exemplary embodiment. FIG. 3 is a timing chart for explaining the readout operation of the pixel signal from pixel 2 by solid-state image capturing device 100 in the first exemplary embodiment. Specifically, FIG. 3 shows the respective control signals supplied to pixel portion 1 and column readout circuit 4 and voltages at respective points of pixel portion 1 and column readout circuit 4.

As shown in FIG. 3, at time t1, the charge transfer signal (TRAN) is L (low), and the pixel reset signal (RST) is H (high), and accordingly, transfer transistor 11 is turned off, and reset transistor 13 is turned on. Hence, a potential (hereinafter, Vfd) of FD 12 is initialized to a FD reset potential Vfdrst (=VDD).

Next, at time t2, the charge transfer signal (TRAN) is L, and the pixel reset signal (RST) is L, and accordingly, transfer transistor 11 and reset transistor 13 are turned off. Hence, such a rest state (initialized state) of the potential of FD 12 is held. At this time, the row selection signal (SEL) is H, and accordingly, selection transistor 15 is ON. Hence, amplification transistor 14 and pixel current source transistor 22 compose the source follower circuit, and Vfdrst−Vth is output as the reset voltage to vertical signal line 18. Actually, the reset voltage is represented as Vfdrst−Vth−α; however, α is omitted here. Moreover, this reset voltage Vfdrst−Vth is input to one of terminals of clamp capacitor 24. Meanwhile, the clamp signal and the S/H capacitor input signal are H, and the potential of the other terminal of clamp capacitor 24 and the potential of S/H capacitor 29 are set to VCL. At time t3, the charge transfer signal (TRAN) is H, and accordingly, the transfer transistor is turned on. Hence, the charges accumulated in PD 10 are transferred to FD 12, and Vfd is decreased by an amount of voltage Vfdsig corresponding to this signal charge quantity, and then becomes Vfdrst−Vfdsig.

At time t4, the charge transfer signal (TRAN) is L, and the row selection signal (SEL) is H, and accordingly, transfer transistor 11 is turned off, and selection transistor 15 is turned on. Hence, Vfdrst−Vfdsig−Vth is output as the read voltage to vertical signal line 18. This stands for that vertical signal line 18 is changed by an amount of Vfdsig. This output of vertical signal line 18 is input to one of the terminals of clamp capacitor 24. Moreover, the clamp signal is L, and accordingly, clamp transistor 25 is OFF. Hence, the potential of the other terminal of clamp capacitor 24, that is, the potential of S/H capacitor 29 rises by Vfdsig×Ccl/(Ccl+Csh). This potential change is a voltage corresponding to the difference between the reset voltage and the read voltage in vertical signal line 18, that is, the pixel signal.

Figure 4:
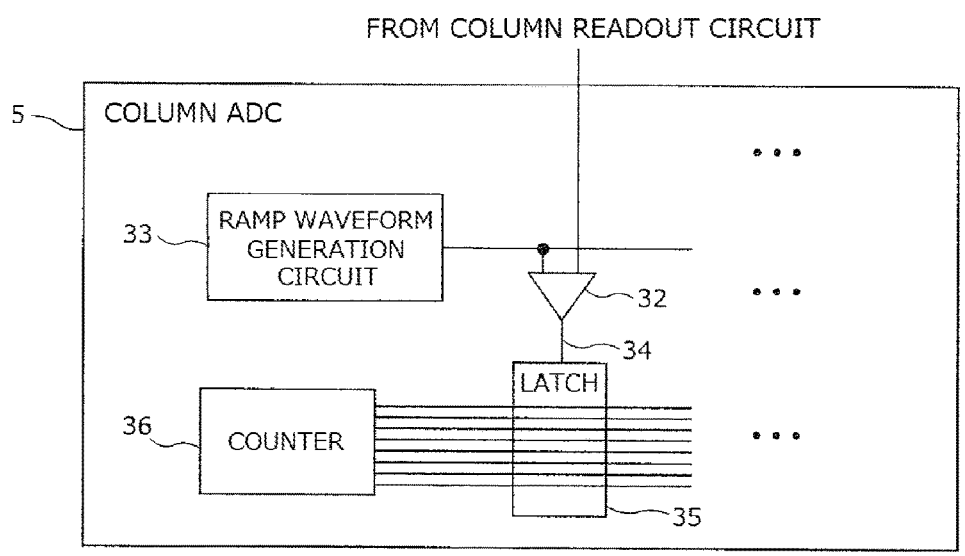
FIG. 4 is a block diagram showing a detailed configuration of a column ADC of the solid-state image capturing device in the first exemplary embodiment.

Thereafter, at time t5, the S/H capacitor input signal is L, whereby this pixel signal is written into S/H capacitor 29. By such a readout operation of the pixel signal as described above, the pixel signals equivalent to one row are held in S/H capacitor 29. Each of the analog pixel signals held in S/H capacitor 29 is converted into a digital value by column ADC 5 described below in detail. FIG. 4 is a block diagram showing a detailed configuration of column ADC 5 of solid-state image capturing device 100 in the first exemplary embodiment of the present disclosure.

As shown in FIG. 4, column ADC 5 includes: ramp waveform generation circuit 33 that generates a ramp waveform; comparators 32, each of which receives each pixel signal from column readout circuit 4, compares the pixel signal with the ramp waveform, and outputs latch signal 34 that becomes H when the ramp waveform is higher than the pixel signal; counter 36 that performs count-up in synchronization with the ramp waveform; and latches 35, each of which has base units corresponding to a number of bits of digital values after the AD conversion, wherein, when an output of counter 36 is input, and a latch signal from comparator 32 is switched from H to L, each base unit writes the switched latch signal therein.

Here, a description is made of an operation performed by column ADC 5, which is configured as described above, with reference to FIG. 5. Specifically, a description is made of an AD conversion operation, which is another one of the basic operations composing the capturing operation of the whole of solid-state image capturing device 100 according to this exemplary embodiment.

Figure 5:
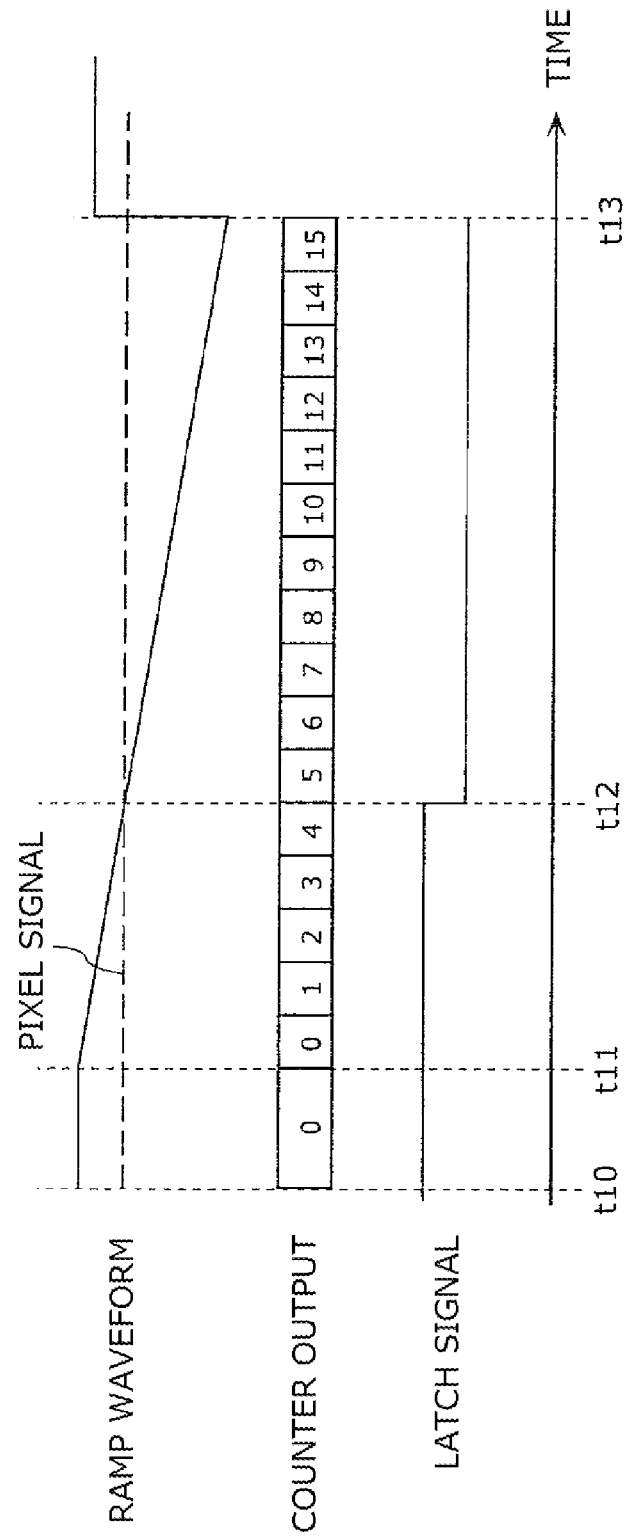
FIG. 5 is a timing chart showing an AD conversion operation of the column ADC of the solid-state image capturing device in the first exemplary embodiment.

FIG. 5 is a timing chart showing the AD conversion operation of column ADC 5 of solid-state image capturing device 100 in the first exemplary embodiment of the present disclosure.

First, at time t10, the pixel signal held in S/H capacitor 29 is input, the ramp waveform is set to a minimum value of the pixel signal, and counter 36 is set to 0. At this time, the ramp waveform is at a higher level than the pixel signal, and accordingly, the latch signal is H.

Next, at time t11, the level of the ramp waveform starts to drop. Here, a slope of the drop of the ramp waveform is set so that the ramp waveform can reach a maximum value of the pixel signal at time t13. Moreover, at time t11, counter 36 also starts the count-up in synchronization with the drop of the ramp waveform.

Thereafter, at time t12, since the ramp waveform becomes lower than the pixel signal, latch signal 34 is switched to the L level, and a counter value at that time is written into latch 35. As mentioned above, the drop of the ramp waveform and the count-up are synchronized with each other, and accordingly, the digital value written into latch 35 is a value corresponding to the pixel signal.

By the AD conversion operation as described above, the pixel signal is converted from an analog signal to a digital signal. This AD conversion operation is performed in parallel in the respective columns, and the analog pixel signals equivalent to one row are subjected to the AD conversion in parallel, and are held in latches 35 of the respective columns. Specifically, in this exemplary embodiment, two vertical signal lines 18a, 18b are disposed in each of the pixel columns, and respective vertical signal lines 18a, 18b are divided into two parts between the upper region and the lower region of pixel portion 1. Hence, in solid-state image capturing device 100 in this exemplary embodiment, analog pixel signals equivalent to four columns are subjected to the AD conversion in parallel, and accordingly, the high-speed readout is enabled.

By the capturing operation including the signal readout operation and the AD conversion operation, which are described as above, solid-state image capturing device 100 in this exemplary embodiment can output the digital pixel signals corresponding to the quantities of received light in respective pixels 2 of pixel portion 1. A description is made below of an overall operation of solid-state image capturing device 100.

As mentioned above, solid-state image capturing device 100 includes, as the drive modes: the full scan mode for use in capturing the still image of the camera; and the mixture mode of three pixels arrayed vertically and three pixels arrayed horizontally. The mixture mode is used for the monitor image of the camera.

Specifically, in the full scan mode, solid-state image capturing device 100 reads out the pixel signals in units of four rows by four vertical signal lines 18a, 18b (two vertical signal lines 18a, 18b before the division), and by column readout circuits 4 and column ADCs 5, implements the digital conversion for the readout pixel signals, and outputs the pixel signals to an outside without performing processing of digital balancers 6 for the pixel signals. By repeating such processing for the whole of pixel portion 1, solid-state image capturing device 100 can output the pixel signals of all pixels 2 of pixel portion 1 at high speed independently of one another. That is to say, a camera or the like, which includes solid-state image capturing device 100, for example, as a chip, can obtain a full pixel image at high speed in a case of driving solid-state image capturing device 100 in the full scan mode.

Meanwhile, in the mixture mode, solid-state image capturing device 100 reads out the pixel signals in units of four rows by four vertical signal lines 18a, 18b (two vertical signal lines 18a, 18b before the division), and by column readout circuits 4 and column ADCs 5, implements the digital conversion for the readout pixel signals, and holds the pixel signals in digital balancers 6. After repeating this processing three times, solid-state image capturing device 100 averages the vertically arrayed three pixels and the horizontally arrayed three pixels, which are held in digital balancer 6, and outputs a mixed signal, which is a pixel signal obtained by averaging these pixels, to the outside. By repeating such processing for the whole of pixel portion 1, solid-state image capturing device 100 can mix the pixel signals of all pixels 2 of pixel portion 1 in units of sets of the vertically arrayed three pixels and the horizontally arrayed three pixels, and can output the mixed pixel signals at high speed. That is to say, the camera or the like, which includes solid-state image capturing device 100, for example, as a chip, can obtain a mixed image at high speed in a case of driving solid-state image capturing device 100 in the mixture mode.

As described above, vertical signal lines 18 disposed in each column are divided, whereby solid-state image capturing device 100 can read out the pixel signals at high speed in both of the full scan mode and the mixture mode. Moreover, two vertical signal lines 18*a*, 18*b* are disposed in each column, whereby solid-state image capturing device 100 can read out the pixel signals at higher speed in both of the full scan mode and the mixture mode. That is to say, solid-state image capturing device 100 can read out the pixel signals of the plurality of pixels 2, which are arranged in matrix in pixel portion 1, in units of four rows, and accordingly, can read out the pixel signals at higher speed in both of the full scan mode and the mixture mode.

Next, a description is made of pixel access flows of solid-state image capturing device 100 in respective cases of the full scan mode and the mixture mode with reference to FIG. 6 to FIG. 9.

Figure 6:
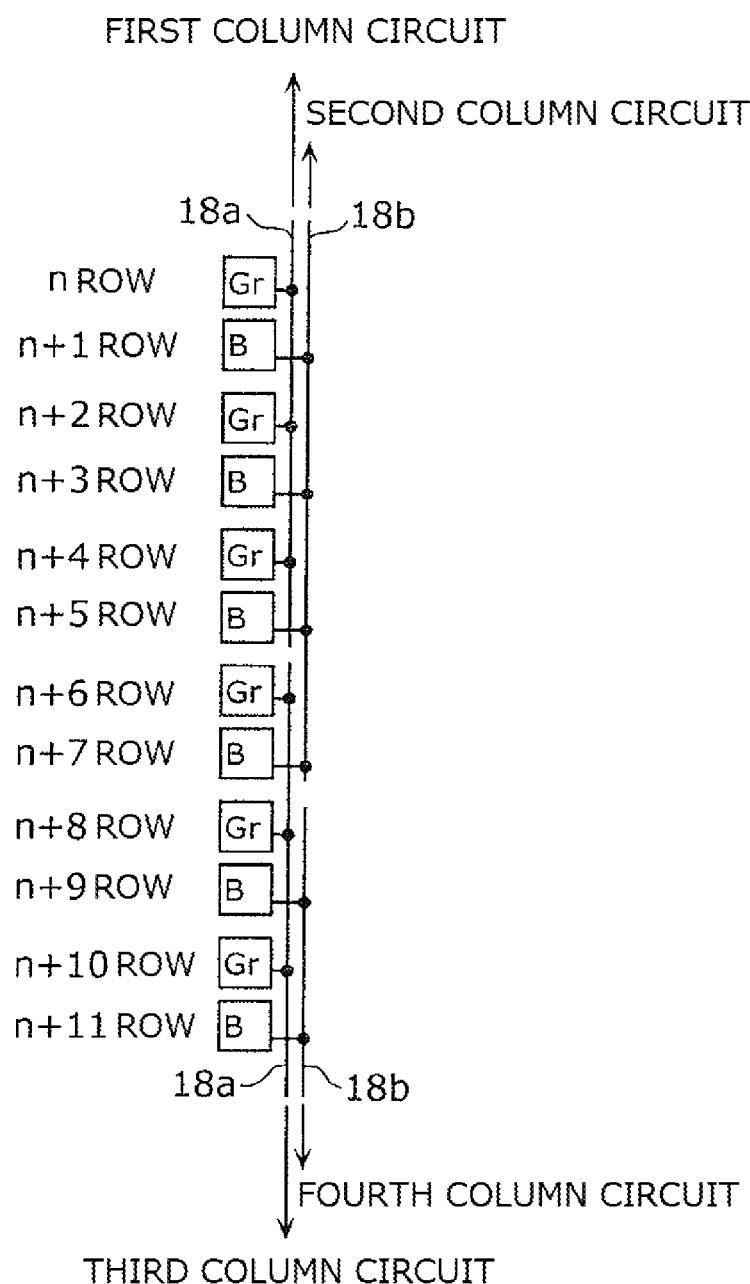
FIG. 6 is a diagram showing connections of pixels, vertical signal lines, and column readout circuits in one column of the pixel portion of the solid-state image capturing device in the first exemplary embodiment.

First, there is considered the full scan mode of reading out pixels 2 equivalent to one column, which is shown in FIG. 6, without mixing pixels 2 concerned. FIG. 6 is a diagram showing connections of pixels 2, vertical signal lines 18*a*, 18*b* and column readout circuits 4 in one column of pixel portion 1 of solid-state image capturing device 100 in the first exemplary embodiment of the present disclosure. Note that, in FIG. 6, a circuit configuration including the base units of column readout circuits 4 and the base units of column ADCs 5 is illustrated as column circuits (first column circuit to fourth column circuit).

Here, in solid-state image capturing device 100 in this exemplary embodiment, two vertical signal lines 18*a*, 18*b* are disposed in each column of pixel portion 1, and vertical signal lines 18*a*, 18*b* are divided between the upper region and the lower region of pixel portion 1. The pixel signals output from the plurality of pixels 2 of each column are read out to the pluralities of column readout circuits 4 and column ADCs 5 through vertical signal line 18*a* disposed in each column and through vertical signal line 18*b* adjacent to the column of pixel portion 1. In such a way, solid-state image capturing device 100 in this exemplary embodiment can read out the pixel signals of two pixel rows in parallel in each of the upper region and the lower region.

To perform the AD conversion operation after the above-described signal readout operation corresponds to one horizontal (H) period operation. FIG. 7 shows combinations of the circuits and the pixel signals of pixels 2, in which the pixel signals are read out to the circuits in respective H periods. FIG. 7 is a table showing accesses of pixels 2 in the respective horizontal periods of the full scan mode of solid-state image capturing device 100 in the first exemplary embodiment of the present disclosure.

As shown in FIG. 7, in each of the H periods, four pixel signals are read out from pixels 2 of the respective columns by using four vertical signal lines (two vertical signal lines 18*a*, 18*b* before the division) and four column circuits (first column circuit to fourth column circuit). This stands for that a high-speed operation can be realized. That is to say, in the respective H periods, column readout circuits 4 and column ADCs 5 can read out the pixel signals from pixel portion 1 in units of four rows, and can perform the AD conversion for the readout pixel signals. That is to say, solid-state image capturing device 100 becomes capable of the high-speed readout in the full scan mode.

Note that, in one end of pixel portion 1, only two pixels are read out simultaneously. That is to say, remaining two pixels are not used, in other words, one of two vertical signal lines 18*a*, 18*b* before the division is not used.

However, for example, if a number of rows of pixel portion 1 is 1000 rows, then necessary H periods are only increased from 250 to 251. An influence of a speed drop at this end processing is as extremely small as 0.4%, and is not regarded as a problem in actual use.

Figure 8:
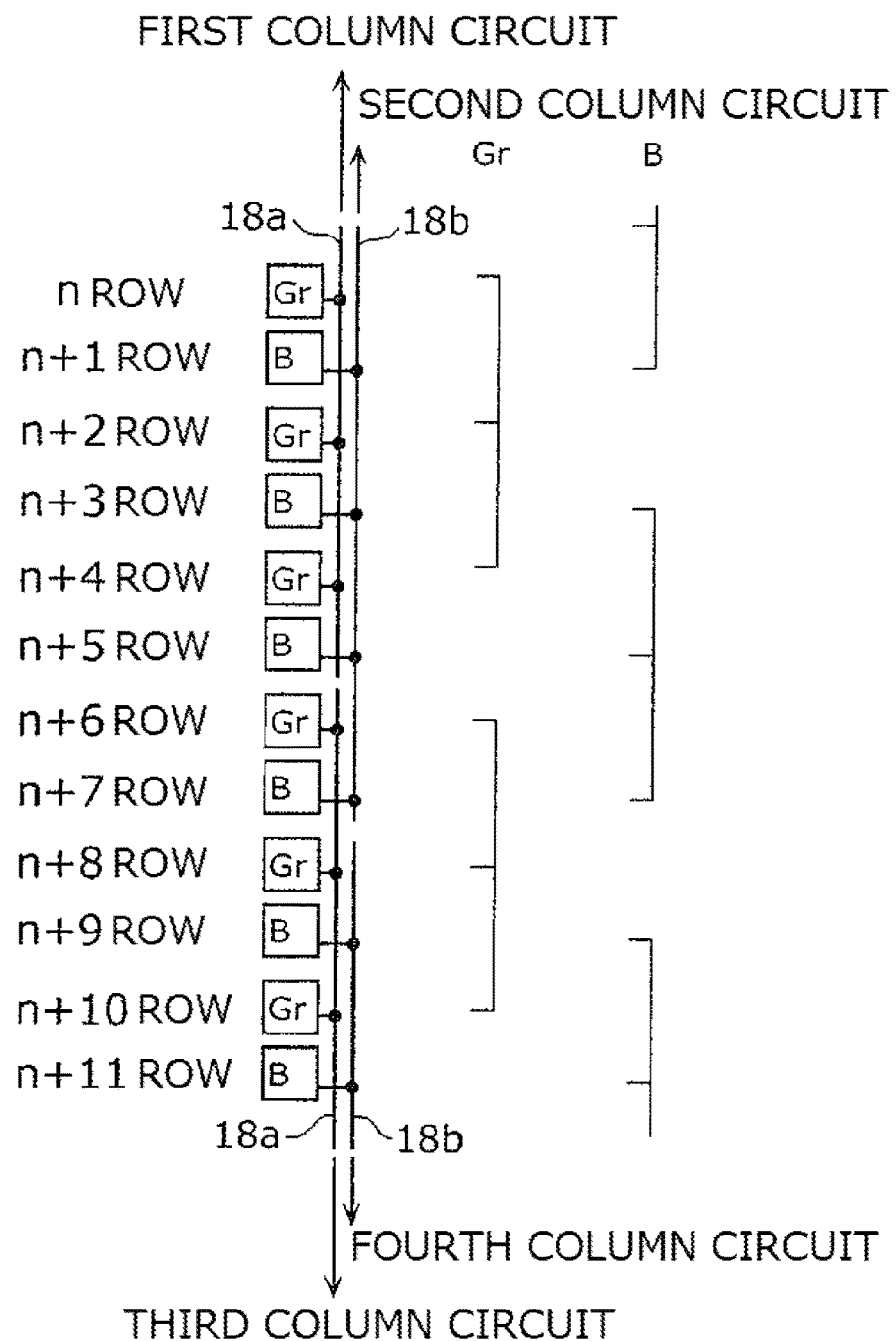
FIG. 8 is a diagram showing connections of the pixels, the vertical signal lines, and the column readout circuits in one column of the pixel portion of the solid-state image capturing device in the first exemplary embodiment and combinations of mixed rows in a mixture mode.

Next, there is considered the mixture mode of reading out pixels 2 equivalent to one column while individually mixing vertically arrayed three pixels 2. FIG. 8 is a diagram showing connections of pixels 2, vertical signal lines 18*a*, 18*b* and column readout circuits 4 in one column of pixel portion 1 of solid-state image capturing device 100 and combinations of the mixed row in the mixture mode in the first exemplary embodiment of the present disclosure.

Here, in solid-state image capturing device 100 in this exemplary embodiment, two vertical signal lines 18*a*, 18*b* are disposed in each column of pixel portion 1, and each of two vertical signal lines 18*a*, 18*b* is divided between the upper region and the lower region of pixel portion 1. In such a way, in each of the upper region and the lower region, the pixel signals of two pixel rows can be read out in parallel, and in addition, the mixture of the pixel signals in the upper region and the mixture of the pixel signals in the lower region can be implemented in parallel.

Specifically, in the mixture mode, three pixels of the same color, which are adjacent to one another in each pixel column, are mixed with one another. For example, as shown in FIG. 8, in a column where Gr/B pixels are arrayed, pixel signals of pixels 2 in even-number rows connected to vertical signal line 18*a* in the upper region of pixel portion 1 are mixed with one another three rows by three rows. That is to say, for example, pixel signals of pixels 2 in an n row, an (n+2) row, and an (n+4) row are mixed with one another. In such a way, the pixel signals of the Gr pixels disposed in the upper region are mixed with one another three by three. Simultaneously at this time, pixel signals of pixels 2 in even-number rows connected to vertical signal line 18*a* in the lower region of pixel portion 1 are mixed with one another three rows by three rows. That is to say, for example, pixel signals of pixels 2 in an (n+6) row, an (n+8) row, and an (n+10) row are mixed with one another. In such a way, the pixel signals of the Gr pixels disposed in the lower region are mixed with one another three by three.

Moreover, simultaneously at this time, pixel signals of pixels 2 in odd-number rows connected to vertical signal line 18*b* in the upper region of pixel portion 1 are mixed with one another three rows by three rows. That is to say, for example, pixel signals of pixels 2 in an (n+3) row, an (n+5) row, and an (n+7) row are mixed with one another. In such a way, the pixel signals of the B pixels disposed in the upper region are mixed with one another three by three. Simultaneously at this time, pixel signals of pixels 2 in odd-number rows connected to vertical signal line 18*b* in the lower region of pixel portion 1 are mixed with one another three rows by three rows. That is to say, for example, pixel signals of pixels 2 in an (n+9) row, an (n+11) row, and an (n+13) row are mixed with one another. In such a way, the pixel signals of the B pixels disposed in the lower region are mixed with one another three by three.

As described above, in the mixture mode, in each of the upper region and the lower region of pixel portion 1, solid-state image capturing device 100 can read out the pixel signals of two pixel rows in parallel, and in addition, can implement the mixture of the pixel signals in the upper region and the mixture of the pixel signals in the lower region in parallel. In such a way, in a similar way to the full scan mode, solid-state image capturing device 100 also becomes capable of the high-speed readout in the mixture mode.

In a similar way to the full scan mode, also in the mixture mode, to perform the AD conversion operation after the above-described signal readout operation corresponds to one horizontal (H) period operation. FIG. 9 shows combinations of the circuits and the pixel signals of pixels 2, in which the pixel signals are read out to the circuits in the respective H periods. FIG. 9 is a table showing accesses of pixels 2 in the respective horizontal periods of the mixture mode of solid-state image capturing device 100 in the first exemplary embodiment of the present disclosure.

As shown in FIG. 9, in each of the H periods, four pixel signals are read out by using four vertical signal lines (two vertical signal lines 18a, 18b before the division) and four column circuits (first column circuit to fourth column circuit). Moreover, when three digital pixel signals are obtained, the averaging processing is performed in digital balancers 6. That is to say, the pixel signals are read out in units of four rows, are subjected to the digital conversion, and are held in digital balancers 6. This processing is repeated three times, and thereafter, the pixel signals held in digital balancers 6 are averaged. In such a way, the pixel signals of the vertically arrayed three pixels are mixed with one another. Note that "A+B+C" in a field of "mixture" in FIG. 9 represents an average of A, B, and C. For example, "(n+4) row+(n+2) row+n row" represent an average of an output of an (n+4)-th row, an output of an (n+2)-th row, and an output of an n-th row. As a matter of course, the average processing may be replaced by addition processing. Each of digital balancers 6 includes the latches, and accordingly, can execute the averaging processing simultaneously with the readout from pixels 2 of the next row. Therefore, the speed drop does not occur.

Here, centers of gravity of the mixed signals which are pixel signals obtained by being averaged by digital balancer 6 become as follows by a fact that the division position of vertical signal line 18a and the division position of vertical signal line 18b are shifted from each other by two rows. That is to say, in the pixel column in which the Gr pixels and the B pixels are arrayed, centers of gravity of the mixed signals of the plurality of Gr pixels and centers of gravity of the mixed signals of the plurality of B pixels are arrayed at an equal pitch. In a similar way, also in the pixel column in which the R pixels and the Gb pixels are arrayed, centers of gravity of the mixed signals of the plurality of Gb pixels and centers of gravity of the mixed signals of the plurality of B pixels are arrayed at an equal pitch.

In such a way, the mixed image that is an image generated by using the mixed signals output from solid-state image capturing device 100 according to this exemplary embodiment becomes a high-quality image in which the moire is suppressed.

That is to say, each of vertical signal lines 18a, 18b is divided at a position where the centers of gravity of the already mixed pixel signals output from the plurality of pixel rows including the R pixels and the centers of gravity of the already mixed pixel signals output from the plurality of pixel rows including the B pixels are located at an equal pitch, whereby solid-state image capturing device 100 according to this exemplary embodiment can realize the mixture mode with high image quality, in which the moire is suppressed. That is to say, solid-state image capturing device 100 capture the monitor image with high quality.

In other words, solid-state image capturing device 100 according to this exemplary embodiment can suppress the occurrence of the moire in a case of being driven in the mixture mode by a following fact. In comparison with the case where vertical signal lines 918a, 918b are divided at the same position in the row direction as in solid-state image capturing device 900 according to the comparative example, the division position of vertical signal line 18a as one of the vertical signal lines is different from the division position of vertical signal line 18b as the other one of the vertical signal lines in the row direction. That is to say, in comparison with solid-state image capturing device 900 according to the comparative example, solid-state image capturing device 100 according to this exemplary embodiment becomes capable of capturing the monitor image with high image quality.

As described above, in solid-state image capturing device 100 according to this exemplary embodiment, in each column of pixel portion 1, one or more vertical signal lines 18 are disposed, and each of vertical signal lines 18 is divided between the upper region and the lower region of pixel portion 1. The pixel signals output from the plurality of pixels 2 of each column are read out to the plurality of column ADCs 5 through two or more vertical signal lines 18 including one or more vertical signal lines 18 disposed in each column. The division position of such one vertical signal line 18a among the plurality of vertical signal lines 18 disposed in pixel portion 1 is different from the division position of such other vertical signal line 18b among the same in the row direction.

As described above, vertical signal lines 18a, 18b are divided, and the pixel signals output from pixels 2 of each column are read out through two or more vertical signal lines 18a, 18b, whereby a time required to read out the pixel signals can be reduced. That is to say, the solid-state image capturing device becomes capable of the high-speed readout. Moreover, the division position of one vertical signal line 18a and the division position of another vertical signal line 18b are different from each other in the row direction, whereby the occurrence of the moire in the case of mixing and reading out the plurality of pixel signals output from the plurality of pixels 2 can be suppressed in comparison with the case where these vertical signal lines 18a, 18b are divided at the same position in the row direction. That is to say, it becomes possible to capture the monitor image with high image quality. Hence, solid-state image capturing device 100 according to this exemplary embodiment makes it possible to capture the monitor image with high image quality while enabling the high-speed readout.

Specifically, in each column of pixel portion 1, two vertical signal lines 18a, 18b are disposed. The pixel signals output from the plurality of pixels 2 of each column are read out to the plurality of column ADCs 5 through two vertical signal lines 18a, 18b disposed in the column Then, the division position of one vertical signal line 18a between two vertical signal lines 18a, 18b disposed in each column is different from the division position of another vertical signal line 18b in the row direction.

In such a way, even in a case where the plurality of pixels 2 corresponding to colors different from each other are disposed in the same column, the occurrence of the moire in the case of mixing and reading out the plurality of pixel signals output from the plurality of pixels 2 can be suppressed.

Moreover, solid-state image capturing device 100 has: the full scan mode that is a drive mode of reading out the pixel signals of all of pixels 2 independently of one another; and the mixture mode that is a drive mode of mixing and reading out the plurality of pixel signals output from the plurality of pixels 2.

In such a way, solid-state image capturing device 100 can strike a balance between the full scan mode that makes it possible to obtain an image with high resolution at high speed and the mixture mode that makes it possible to obtain an image with a little moire at high speed.

Moreover, in pixel portion 1, in the Bayer matrix, there are arranged: the R pixels (red pixels) which output the pixel signals based on red light; the B pixels (blue pixels) which output the pixel signals based on blue light; and the Gr pixels and the Gb pixels (green pixels) which output the pixel signals based on green light. Vertical signal lines 18a, 18b are divided at the positions corresponding to a positional relationship between the centers of gravity of the already mixed pixel signals output from the plurality of rows including the R pixels and the centers of gravity of the already mixed pixel signals output from the plurality of rows including the B pixels.

That is to say, vertical signal lines 18a, 18b are divided at positions corresponding to a positional relationship between a pair of the center of gravity of the already mixed pixel signals of the R pixels (center of gravity of the mixed signals of the R pixels) and the center of gravity of the already mixed pixel signals of the Gr pixels (center of gravity of the mixed signals of the Gr pixels) and a pair of the center of gravity of the already mixed pixel signals of the Gb pixels (center of gravity of the mixed signals of the Gb pixels) and the center of gravity of the already mixed pixel signals of the B pixels (center of gravity of the mixed signals of the B pixels).

Specifically, vertical signal lines 18a, 18b are divided at such positions where the centers of gravity of the already mixed pixel signals output from the plurality of rows including the red pixels and the centers of gravity of the already mixed pixel signals output from the plurality of rows including the blue pixels are located at an equal pitch.

In such a way, solid-state image capturing device 100 can further suppress the occurrence of the moire in the mixture mode.

Note that each of column ADCs 5 has a configuration in which counters are provided in the respective base units. If the counters are stopped by the latch signal, then values at that time become such digital conversion values. In this case, if the digital conversion is continuously performed without initializing the counters, then the addition can also be executed in column ADC 5. In this case, obtained values are usable for the mixed image though a bit width is increased.

Moreover, in this exemplary embodiment, the division position of vertical signal line 18b is shifted from the division position of vertical signal line 18a by two rows; however, vertical signal lines 18a, 18b may be divided in other ways shown in FIG. 10A to FIG. 10D as long as the mixture of Gr and B is performed at an equal pitch. Specifically, in the first exemplary embodiment, the division position of vertical signal line 18a is between the (n+5)-th row and the (n+6)-th row, and the division position of vertical signal line 18b is between the (n+7)-th row and the (n+8)-th row; however, the division positions of vertical signal lines 18a, 18b are not limited to this. FIGS. 10A to 10D are diagrams showing other division methods of the vertical signal lines of solid-state image capturing device in the first exemplary embodiment of the present disclosure.

Figure 10A:
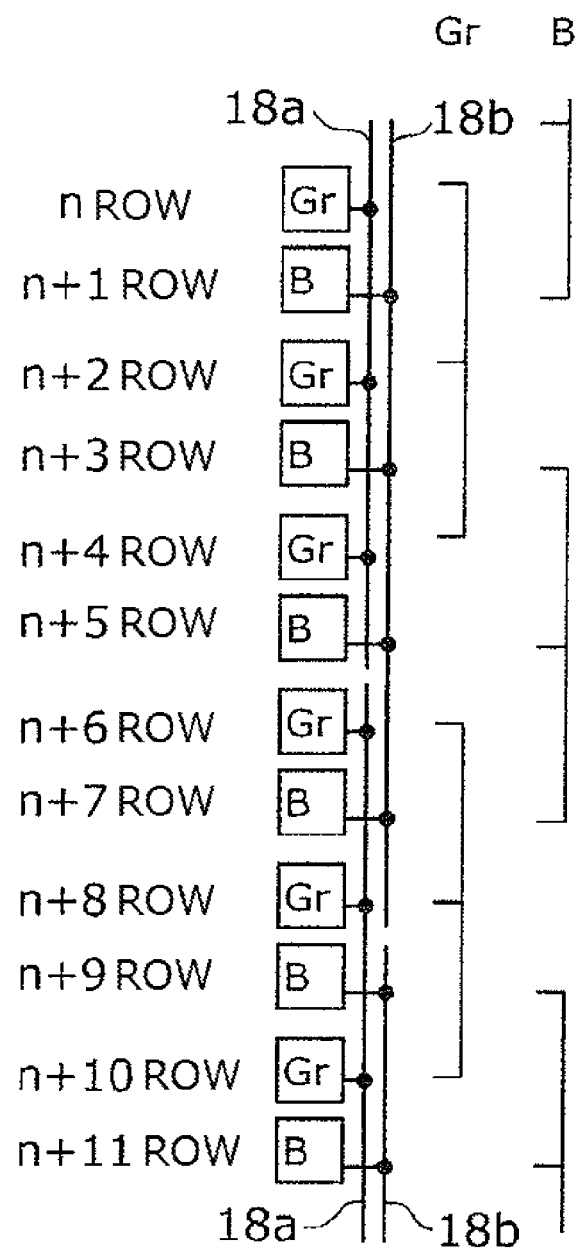
FIG. 10A is a diagram showing another division method of the vertical signal lines of the solid-state image capturing device in the first exemplary embodiment.

As shown in FIG. 10A, the division position of vertical signal line 18a may be between the (n+5)-th row and the (n+6)-th row, and the division position of vertical signal line 18b may be between the (n+8)-th row and the (n+9)-th row. That is to say, the division position of vertical signal line 18b is shifted from the division position of vertical signal line 18a by three rows. Note that, even in a configuration shown in FIG. 10A, combinations of the pixels which output the pixel signals mixed in the mixture mode are similar to those of the first exemplary embodiment.

Figure 10B:
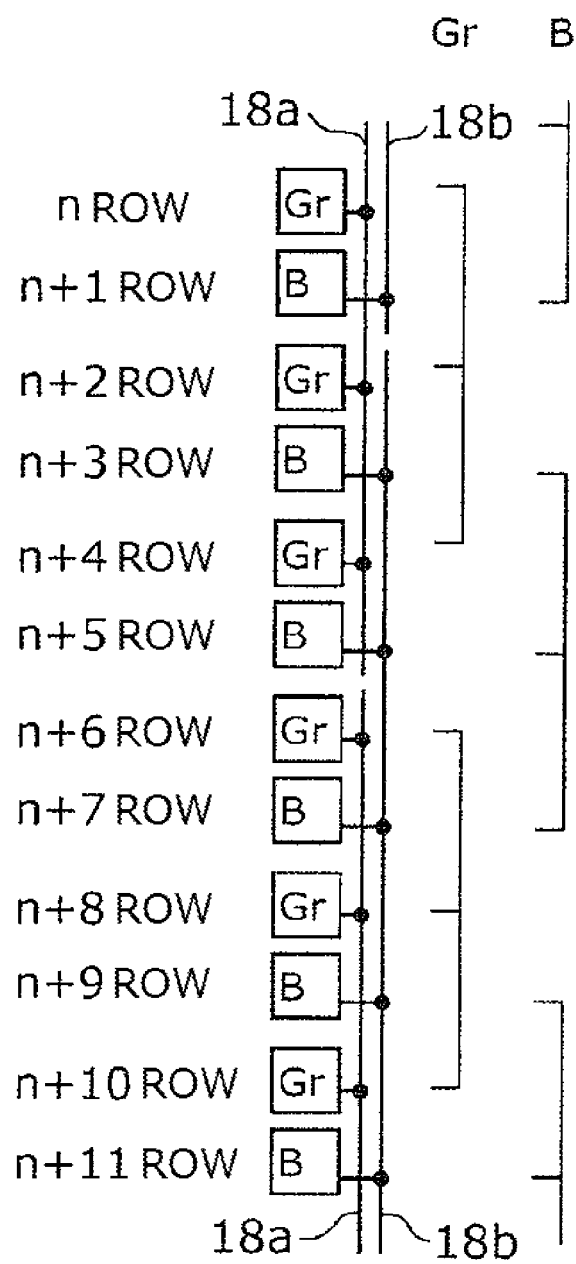
FIG. 10B is a diagram showing a still another division method of the vertical signal lines of the solid-state image capturing device in the first exemplary embodiment.

Moreover, as shown in FIG. 10B, the division position of vertical signal line 18a may be between the (n+5)-th row and the (n+6)-th row, and the division position of vertical signal line 18b may be between the (n+1)-th row and the (n+2)-th row. That is to say, the division position of vertical signal line 18b is shifted from the division position of vertical signal line 18a by four rows. Note that, even in a configuration shown in FIG. 10B, combinations of the pixels which output the pixel signals mixed in the mixture mode are similar to those of the first exemplary embodiment.

Figure 10C:
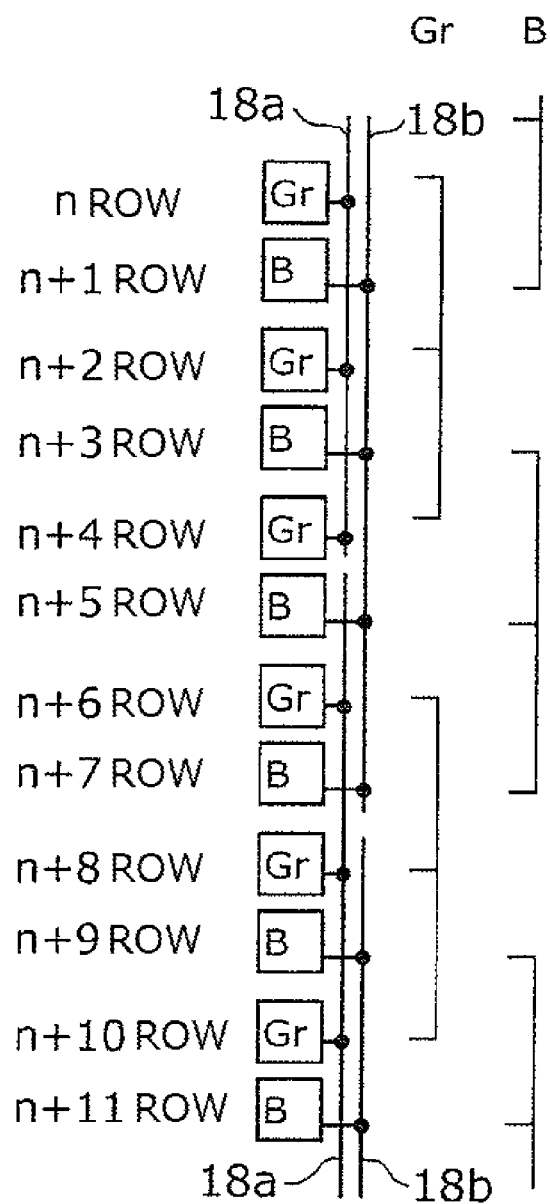
FIG. 10C is a diagram showing a yet another division method of the vertical signal lines of the solid-state image capturing device in the first exemplary embodiment.

Moreover, as shown in FIG. 10C, the division position of vertical signal line 18a may be between the (n+4)-th row and the (n+5)-th row, and the division position of vertical signal line 18b may be between the (n+7)-th row and the (n+8)-th row. That is to say, the division position of vertical signal line 18b is shifted from the division position of vertical signal line 18a by three rows. Note that, even in a configuration shown in FIG. 10C, combinations of the pixels which output the pixel signals mixed in the mixture mode are similar to those of the first exemplary embodiment.

Figure 10D:
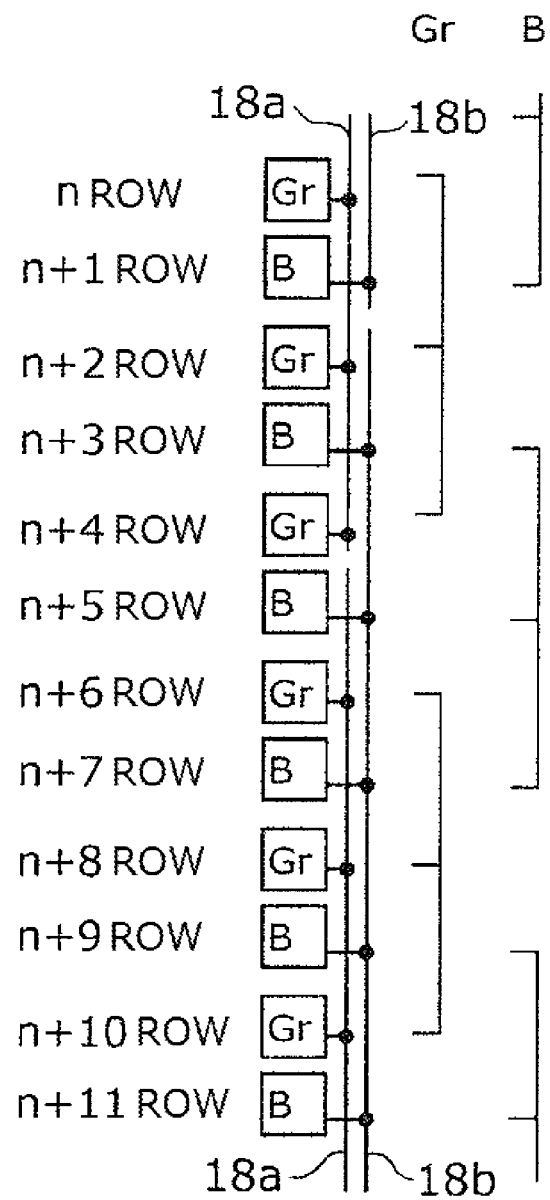
FIG. 10D is a diagram showing a yet another division method of the vertical signal lines of the solid-state image capturing device in the first exemplary embodiment.

Moreover, as shown in FIG. 10D, the division position of vertical signal line 18a may be between the (n+4)-th row and the (n+5)-th row, and the division position of vertical signal line 18b may be between the (n+1)-th row and the (n+2)-th row. That is to say, the division position of vertical signal line 18b is shifted from the division position of vertical signal line 18a by three rows. Note that, even in a configuration shown in FIG. 10D, combinations of the pixels which output the pixel signals mixed in the mixture mode are similar to those of the first exemplary embodiment.

Moreover, in a case where other relationship than the equal pitch is desired to be given between the centers of gravity of the mixture of Gr and the centers of gravity of the mixture of B, the division position of vertical signal line 18a and the division position of vertical signal line 18b just need to be shifted from each other by an amount corresponding to the desired relationship. That is to say, a shift amount of the division position of vertical signal line 18b with respect to the division position of vertical signal line 18a just needs to be based on the positional relationship between the centers of gravity of the mixed signals of the Gr pixels and the centers of gravity of the mixed signals of the B pixels.

Moreover, in this exemplary embodiment, solid-state image capturing device 100 includes column readout circuits 4 which have a clamp function;

however, in the solid-state image capturing device according to the present disclosure, column readout circuits 4 may be omitted, and vertical signal lines 18 may be directly connected to column ADCs 5. That is to say, in this exemplary embodiment, column ADCs 5 read out the pixel signals, which are output from pixel portion 1, through column readout circuits 4; however, may read out the pixel signals, which are output from pixel portion 1, not through column readout circuits 4.

Figure 11A:
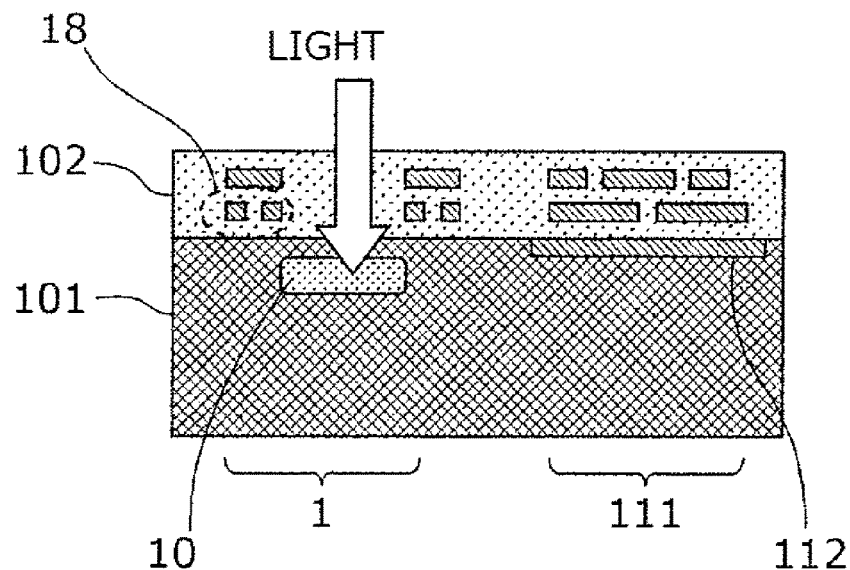
FIG. 11A is a view showing an example of a cross-sectional structure of the solid-state image capturing device in the first exemplary embodiment.
Figure 11B:
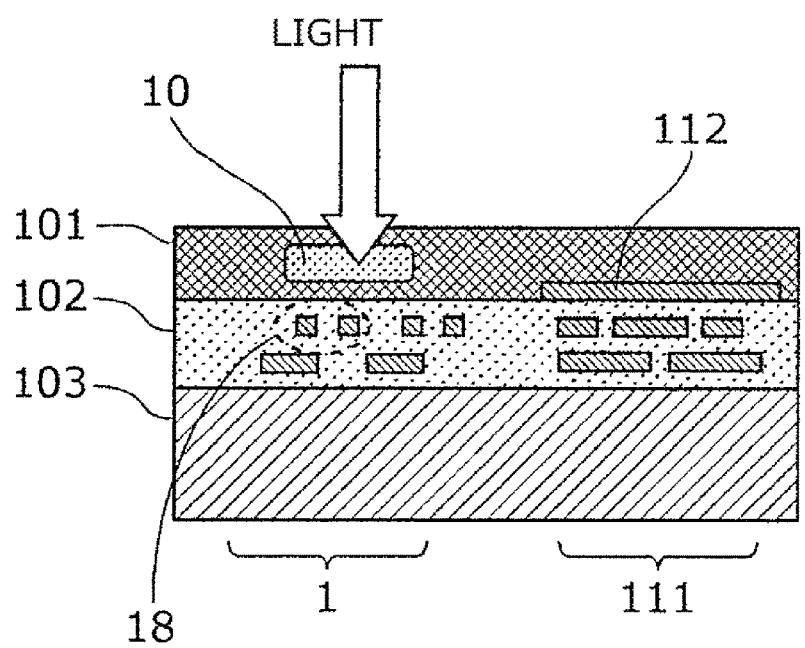
FIG. 11B is a view showing another example of the cross-sectional structure of the solid-state image capturing device in the first exemplary embodiment.

Moreover, the solid-state image capturing device according to the present disclosure can be applied not only to a surface irradiation-type image sensor (surface irradiation-type solid-state image capturing device) shown in FIG. 11A but also a rear surface irradiation-type image sensor (rear surface irradiation-type solid-state image capturing device) shown in FIG. 11B. That is to say, the solid-state image capturing device according to the present disclosure can be applied not only to a structure, in which PD 10 is formed on a surface of a silicon substrate, that is, on a same surface side as a surface on which the circuit elements are formed, but also to a structure, in which PD 10 is formed on a rear surface of the silicon substrate, that is, on a rear surface side with respect to the surface on which the circuit elements are formed. FIG. 11A is a view showing an example of a cross-sectional structure of solid-state image capturing device 100 in the first exemplary embodiment of the present disclosure, and FIG. 11B is a view showing another example of the cross-sectional structure of solid-state image capturing device 100 in the first exemplary embodiment of the present disclosure.

The surface irradiation-type image sensor shown in FIG. 11A has a layered structure of silicon substrate 101 and wiring layer 102, and PD 10 formed in silicon substrate 101 receives light irradiated from the wiring layer 102 side. Specifically, in pixel portion 1, PD 10 is formed in silicon substrate 101, and in circuit portion 111 including column readout circuit 4 and column ADC 5, circuit elements 112 such as a transistor and a capacitor are formed in silicon substrate 101.

In contrast, the rear surface irradiation-type image sensor shown in FIG. 11B has a layered structure of support substrate 103, silicon substrate 101 and wiring layer 102, and PD 10 formed in silicon substrate 101 receives light irradiated from an opposite side with the wiring layer 102 side. As described above, the rear surface irradiation-type image sensor has a structure, in which silicon substrate 101 is thinned to approximately 3 μm, and light is irradiated from a rear surface. This rear surface irradiation-type image sensor is capable of disposing wires so that the wires can overlap PD 10, and has an advantage that a degree of layout freedom of the plurality of vertical signal lines 18 in the present disclosure is high. In such a way, a space between two vertical signal lines 18a, 18b can be widely ensured, and accordingly, a crosstalk between vertical signal lines 18a, 18b can be reduced.

Figure 12:
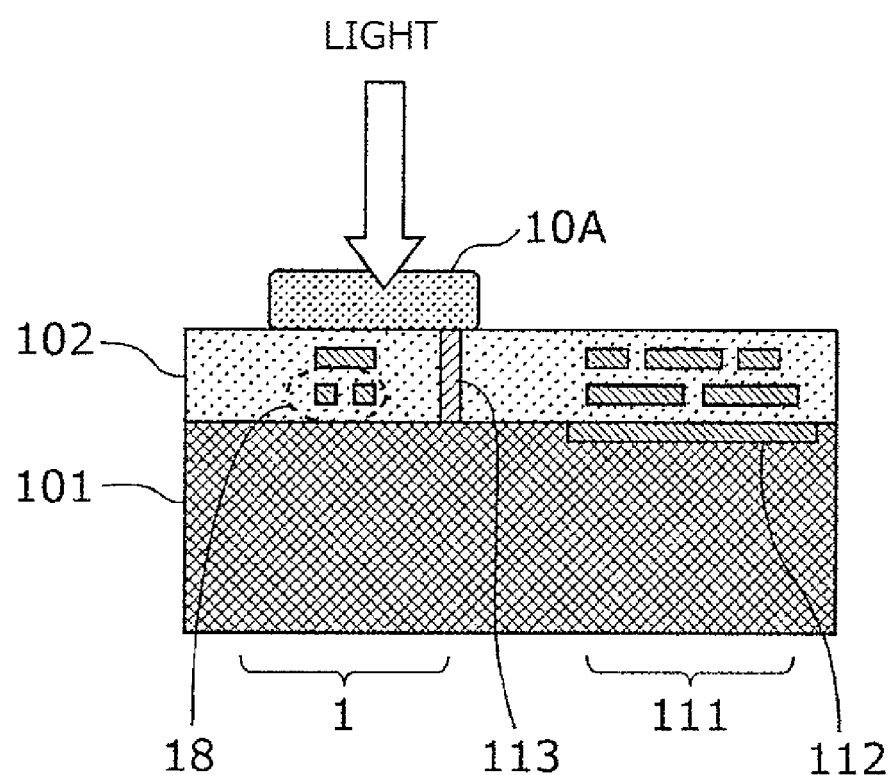
FIG. 12 is a view showing a still another example of the cross-sectional structure of the solid-state image capturing device in the first exemplary embodiment.

Moreover, the present disclosure can also be applied to a layered image sensor shown in FIG. 12. FIG. 12 is a view showing still another example of the cross-sectional structure of solid-state image capturing device 100 in the first exemplary embodiment of the present disclosure.

The layered image sensor shown in FIG. 12 has a structure in which a photoelectric conversion film 10A different from silicon is disposed above vertical signal lines 18. Charges generated in photoelectric conversion film 10A are transferred through charge readout portion 113 to circuit portion 111 formed in silicon substrate 101, and are read out as pixel signals. The layered image sensor as described above is capable of disposing vertical signal line 18 so that vertical signal lines 18 can overlap photoelectric conversion film 10A, and has an advantage that a degree of layout freedom of the plurality of vertical signal lines 18 in the present disclosure is increased. In such a way, in a similar way to the rear surface irradiation-type image sensor, the layered image sensor can widely ensure the space between two vertical signal lines 18a, 18b, and accordingly, can reduce the crosstalk between vertical signal lines 18a, 18b.

Second Exemplary Embodiment

Figure 13:
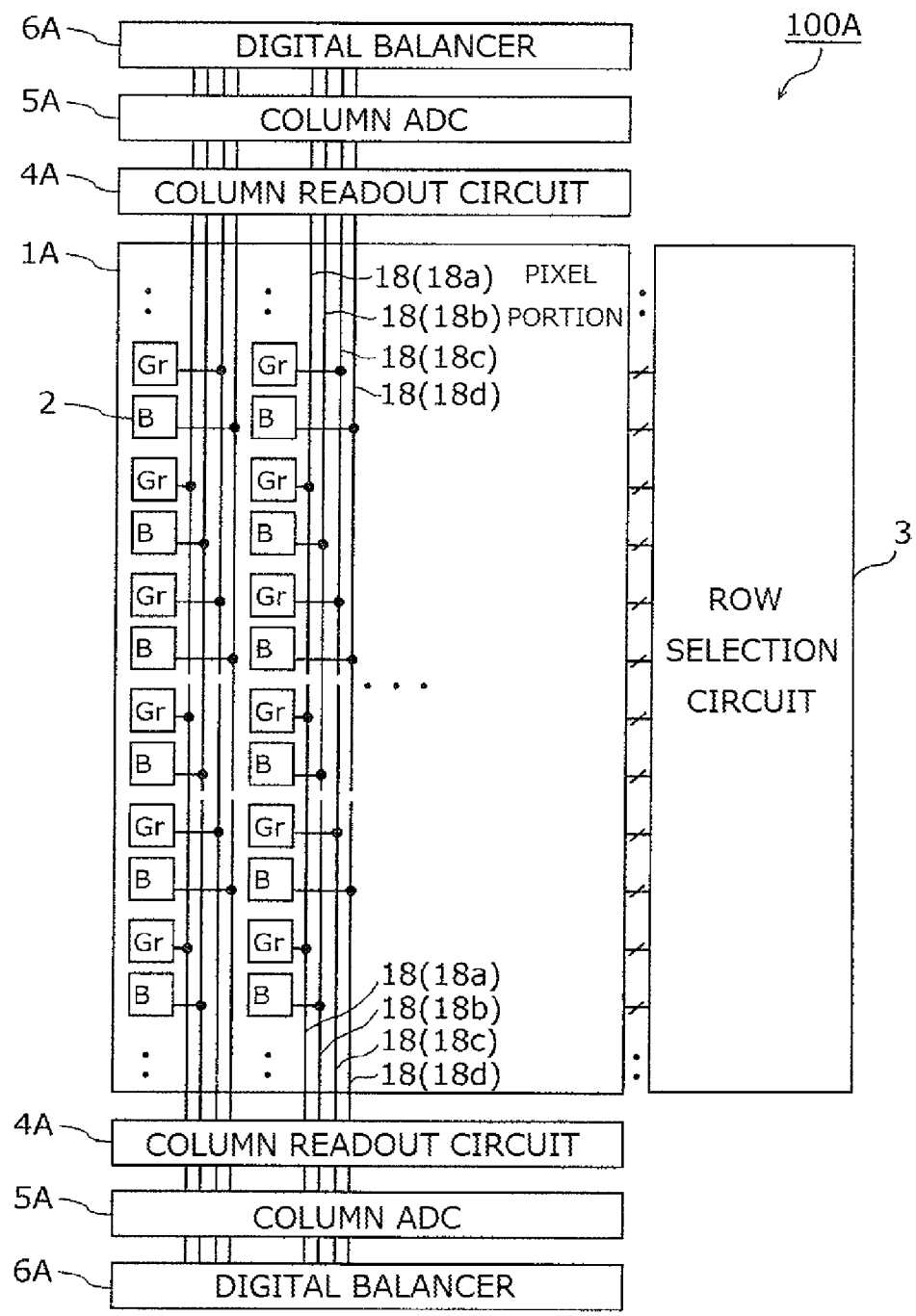
FIG. 13 is a block diagram showing an overall configuration of a solid-state image capturing device in a second exemplary embodiment.

Next, a description is made of the second exemplary embodiment of the present disclosure. FIG. 13 is a block diagram showing an overall configuration of a solid-state image capturing device in the second exemplary embodiment of the present disclosure.

As shown in FIG. 13, solid-state image capturing device 100A according to this exemplary embodiment includes: pixel portion 1A; row selection circuit 3; column readout circuits 4A; column ADCs 5A; and digital balancers 6A. Column readout circuits 4A, column ADCs 5A, and digital balancers 6A are disposed one set by one set in an upper part and a lower part of a periphery of pixel portion 1A.

Pixel portion 1A is a capture region in which pixels 2 performing photoelectric conversion are arranged two-dimensionally. This pixel portion 1A is substantially similar to pixel portion 1 in the first exemplary embodiment; however, is different from pixel portion 1 in that four vertical signal lines 18a to 18d are disposed in parallel in each column, and that respective vertical signal lines 18a to 18d are divided into upper and lower parts and become totally eight vertical signal lines 18a to 18d. Moreover, division positions include two types, in each of which the division positions are shifted from each other by two rows. Each of pixels 2 of respective rows is sequentially connected to any of four vertical signal lines 18a to 18d. Note that, hereinafter, in a case where it is not particularly necessary to distinguish vertical signal lines 18a to 18d from one another, these vertical signal lines are simply referred to as vertical signal lines 18 in some case.

In other words, in each column of pixel portion 1A, two sets of a plurality of vertical signal lines 18 in which the division positions are different from each other in the row direction are disposed. Specifically, the division position of vertical signal line 18c is same as the division position of vertical signal line 18a, and the division position of vertical signal line 18d is same as the division position of vertical signal line 18b. That is to say, a fact that four vertical signal lines 18a to 18d are disposed in each column of pixel portion 1A is same as a fact that two sets, each of which is composed of vertical signal lines 18a, 18b, are disposed in each column of pixel portion 1A.

In such a way, solid-state image capturing device 100A according to this exemplary embodiment can simultaneously read out pixel signals of pixels 2, which correspond to one set (set composed of vertical signal lines 18a, 18b) among the plural sets of vertical signal lines 18a to 18d disposed in the same column, and pixel signals of pixels 2, which correspond to other set (set composed of vertical signal lines 18c, 18d) thereamong. Hence, solid-state image capturing device 100A becomes capable of performing the readout at higher speed than solid-state image capturing device 100 according to the first exemplary embodiment.

Row selection circuit 3, column readout circuits 4A, column ADCs 5A, and digital balancers 6A are similar to those of the first exemplary embodiment; however, column readout circuits 4A, column ADCs 5A, and digital balancers 6A are different from column readout circuits 4, column ADCs 5 and digital balancers 6 in the first exemplary embodiment in that base units of each of these are four per column.

Note that, in this exemplary embodiment, solid-state image capturing device 100A includes column readout circuits 4A which have a clamp function; however, in the solid-state image capturing device according to the present disclosure, column readout circuits 4A may be omitted, and vertical signal lines 18a to 18d may be directly connected to column ADCs 5A. That is to say, in this exemplary embodiment, column ADCs 5A read out the pixel signals, which are output from pixel portion 1A, through column readout circuits 4A; however, may read out the pixel signals, which are output from pixel portion 1A, not through column readout circuits 4A.

In a similar way to solid-state image capturing device 100 according to the first exemplary embodiment, solid-state image capturing device 100A according to this exemplary embodiment includes, as the drive modes: the full scan mode for use in capturing the still image of the camera; and the mixture mode of three pixels arrayed vertically and three pixels arrayed horizontally. The mixture mode is used for the monitor image of the camera.

Specifically, in the full scan mode, solid-state image capturing device 100A reads out the pixel signals in units of eight rows by eight vertical signal lines 18a to 18d (four vertical signal lines 18a to 18d before the division), and by column readout circuits 4A and column ADCs 5A, implements the digital conversion for the readout pixel signals, and outputs the pixel signals to an outside without being processed in digital balancers 6A. By repeating such processing for the whole of pixel portion 1A, solid-state image capturing device 100A can output the pixel signals of all pixels 2 of pixel portion 1A independently of one another. That is to say, a camera or the like, which includes solid-state image capturing device 100A, for example, as a chip, can obtain a full pixel image in a case of driving solid-state image capturing device 100A in the full scan mode.

Meanwhile, in the mixture mode, solid-state image capturing device 100A reads out the pixel signals in units of eight rows by eight vertical signal lines 18a to 18d (four vertical signal lines 18a to 18d before the division), and by column readout circuits 4A and column ADCs 5A, implements the digital conversion for the readout pixel signals, and holds the pixel signals in digital balancers 6A. After repeating this processing three times, solid-state image capturing device 100A averages the vertically arrayed three pixels and the horizontally arrayed three pixels, which are held in digital balancer 6A, and outputs a mixed signal, which is a pixel signal obtained by averaging these pixels, to the outside. By repeating such processing for the whole of pixel portion 1A, solid-state image capturing device 100A can mix the pixel signals of all pixels 2 of pixel portion 1A in units of sets of the vertically arrayed three pixels and the horizontally arrayed three pixels, and can output the mixed pixel signals. That is to say, the camera or the like, which includes solid-state image capturing device 100A, for example, as a chip, can obtain a mixed image in a case of driving solid-state image capturing device 100A in the mixture mode.

As described above, the pixel signals of eight pixels are read out in parallel in the full scan mode, and accordingly, solid-state image capturing device 100A according to this exemplary embodiment is capable of capturing the image at higher speed than solid-state image capturing device 100 according to the first exemplary embodiment. Moreover, the division positions are shifted from each other by two rows in the mixture mode, whereby the centers of gravity of the Gr pixels and the centers of gravity of the B pixels are located at an equal pitch, and a high-quality monitor image with a little moire is obtained.

As described above, in accordance with solid-state image capturing device 100A according to this exemplary embodiment, in a similar way to the above-described first exemplary embodiment, in each column of pixel portion 1A, one or more vertical signal lines 18a to 18d are disposed, and each of vertical signal lines 18a to 18d is divided between the upper region and the lower region of pixel portion 1A. The pixel signals output from the plurality of pixels 2 of each column are read out to the plurality of column ADCs 5A through two or more vertical signal lines 18a to 18d including one or more vertical signal lines 18a to 18d disposed in each column. The division position of such one-side vertical signal lines 18a, 18c among the plurality of vertical signal lines 18a to 18d disposed in pixel portion 1A is different from the division position of such other-side vertical signal lines 18b, 18d among the same in the row direction.

In such a way, solid-state image capturing device 100A according to this exemplary embodiment can exert a similar effect to that of the above-described first exemplary embodiment.

Specifically, in each column of pixel portion 1A, the plural sets (two sets in this exemplary embodiment) composed of the plurality of vertical signal lines 18 in which the division positions are different from each other in the row direction are disposed, and the pixel signals output from the plurality of pixels 2 of each column are read out to the plurality of column ADCs 5A through the plural sets of vertical signal lines 18 disposed in each column.

In such a way, solid-state image capturing device 100A according to this exemplary embodiment can simultaneously read out the pixel signals of pixels 2, which correspond to one set (set composed of vertical signal lines 18a, 18b) among the plural sets of vertical signal lines 18a to 18d disposed in the same column, and the pixel signals of pixels 2, which correspond to the other set (set composed of vertical signal lines 18c, 18d) thereamong. Hence, solid-state image capturing device 100A becomes capable of performing the readout at higher speed than solid-state image capturing device 100 according to the first exemplary embodiment.

Note that, in this exemplary embodiment, two sets, each of which is composed of the plurality of vertical signal lines 18 in which the division positions are different from each other in the row direction, are disposed in each column of pixel portion 1A; however, a number of the sets of vertical signal lines 18 disposed in each column juts needs to be plural, and for example, may be three.

Third Exemplary Embodiment

Figure 14:
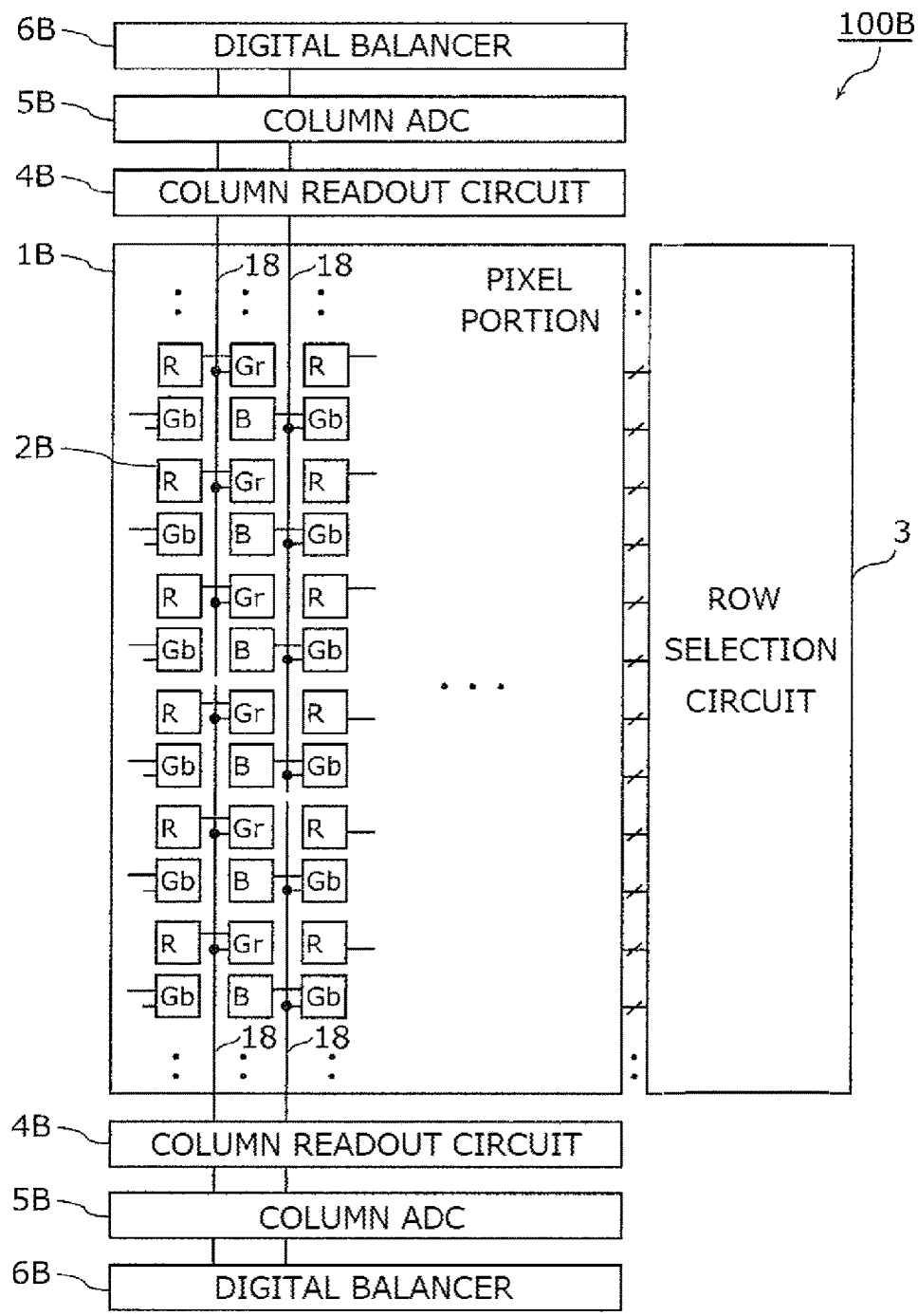
FIG. 14 is a block diagram showing an overall configuration of a solid-state image capturing device in a third exemplary embodiment.

Next, a description is made of the third exemplary embodiment of the present disclosure. FIG. 14 is a block diagram showing an overall configuration of a solid-state image capturing device in the third exemplary embodiment of the present disclosure.

As shown in FIG. 14, solid-state image capturing device 100B according to this exemplary embodiment includes: pixel portion 1B; row selection circuit 3; column readout circuits 4B; column ADCs 5B; and digital balancers 6B. Column readout circuits 4B, column ADCs 5B, and digital balancers 6B are disposed one set by one set in an upper part and a lower part of a periphery of pixel portion 1B.

Pixel portion 1B is a capture region in which pixels 2B performing photoelectric conversion are arranged two-dimensionally. Lateral two pixels 2B, which are taken as a set, have one output, and are electrically connected to each of vertical signal lines 18 disposed one by one in the respective columns. Combinations of the lateral two pixels are arranged so as to be shifted by one column from each other between odd-number rows and even-number rows.

Moreover, each vertical signal line 18 is divided into an upper part and a lower part, and becomes two vertical signal lines per column Positions of the division are shifted by two rows from each other between odd-number columns and even-number columns. That is to say, pixel signals output from a plurality of pixels 2B of each column are read out through vertical signal line 18 disposed in the column, and through vertical signal line 18 disposed in a column adjacent to that column Such a division position of vertical signal line 18 disposed in each column is different from such a division position of vertical signal line 18 disposed in the column adjacent to that column in the row direction. Note that pixels 2B will be described later in detail.

Row selection circuit 3, column readout circuits 4B, column ADCs 5B, and digital balancers 6B are similar to those of the first exemplary embodiment; however, column readout circuits 4B, column ADCs 5B, and digital balancers 6B are different from column readout circuits 4, column ADCs 5, and digital balancers 6 in the first exemplary embodiment in that a number of base units of each of these is one per column That is to say, two pixels 2B adjacent to each other in the column direction have one output, whereby solid-state image capturing device 100B according to this exemplary embodiment can reduce a number of peripheral circuits of pixel portion 1A more than solid-state image capturing device 100 according to the first exemplary embodiment. Hence, solid-state image capturing device 100B can be downsized.

Figure 15:
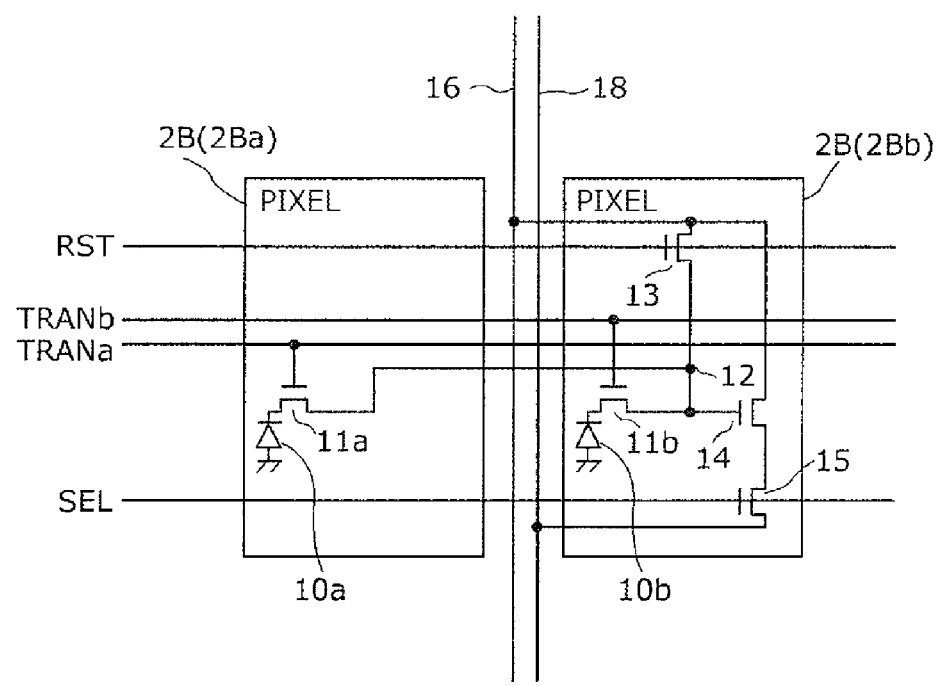
FIG. 15 is a circuit diagram showing a detailed configuration of pixels of the solid-state image capturing device in the third exemplary embodiment.

Next, a description is made of a configuration of pixels 2B. FIG. 15 is a circuit diagram showing a detailed configuration of pixels 2B of solid-state image capturing device 100B in the third exemplary embodiment of the present disclosure. FIG. 15 shows pixel circuits of two pixels 2B adjacent to each other.

Two pixels 2B shown in FIG. 15 output, to vertical signal line 18 corresponding to pixels 2B, a reset voltage obtained by amplifying an initialization-time voltage, and a read voltage obtained by amplifying a readout-time voltage. Moreover, these two pixels 2B include: two photodiodes (PD) 10a, 10b which perform photoelectric conversion for incident light and outputs charges; floating diffusion (FD) 12 that accumulates the charges generated by PD 10a or 10b and outputs the accumulated charges as a voltage signal; reset transistor 13 that resets the voltage indicated by FD 12 to an initial voltage (here, VDD); two transfer transistors 11a, 11b which supply FD 12 with the charges output by PD 10a or 10b; amplification transistor 14 that outputs a voltage changed following the voltage indicated by FD 12; and selection transistor 15 that connects the output of amplification transistor 14 to vertical signal line 18 upon receiving line selection signals (SEL in FIG. 15) from row selection circuit 3.

Here, two pixels 2B have a configuration in which, though the PD and the transfer transistor are provided in each of the pixels, other three types of the transistors are shared by the two pixels. Specifically, pixel 2Ba disposed on a left side of FIG. 15 includes PD 10a and transfer transistor 11a, and pixel 2Bb disposed on a right side of FIG. 15 includes PD 10b, transfer transistor 11b, FD 12, reset transistor 13, amplification transistor 14, and selection transistor 15. That is to say, two pixels 2Ba, 2Bb adjacent to each other in the column direction share reset transistor 13, amplification transistor 14, and selection transistor 15. That is to say, two pixels 2B adjacent to each other in the column direction share the transistors, whereby solid-state image capturing device 100B according to this exemplary embodiment can increase an area of the photodiode more than solid-state image capturing device 100 according to the first exemplary embodiment. Hence, sensitivity can be enhanced.

Note that such a disposition shown in FIG. 15, in which all of the shared transistors (reset transistor 13, amplification transistor 14, and selection transistor 15) are placed in right pixel 2Bb, is merely an example. Another disposition may be adopted, in which, for example, one of these three shared transistors is disposed in pixel 2Ba and other two of these are disposed in pixel 2Bb.

Figure 16:
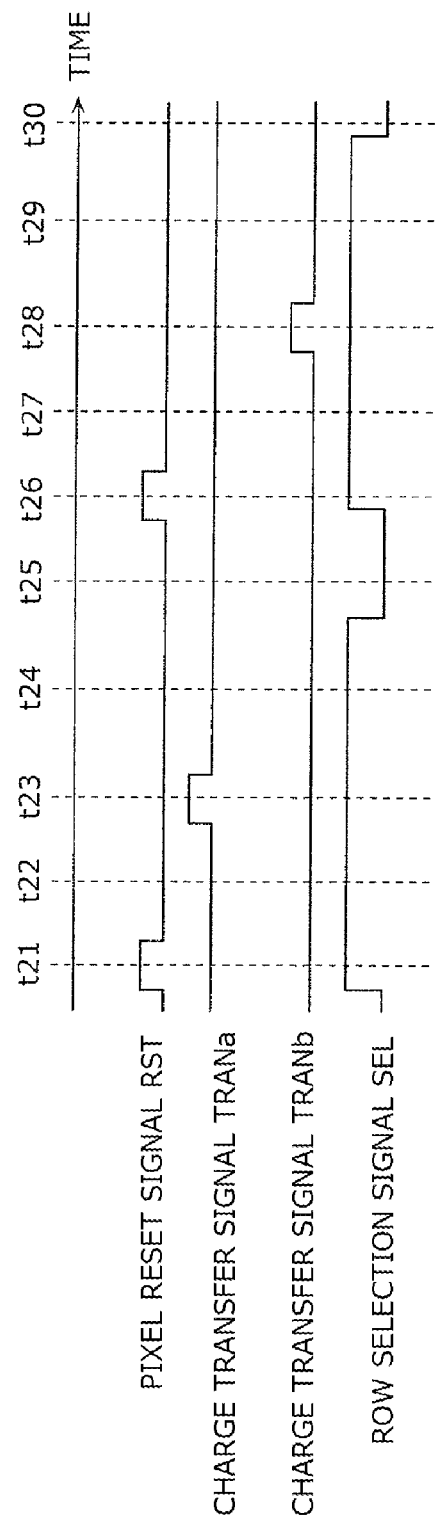
FIG. 16 is a chart showing pieces of timing of respective control signals regarding readout of the pixels of the solid-state image capturing device in the third exemplary embodiment.

Next, a description is made of an operation of solid-state image capturing device 100B, which is configured as described above, with reference to FIG. 16. Specifically, a description is made of a signal readout operation from pixel 2B, which is one of basic operations composing a capturing operation of a whole of solid-state image capturing device 100B according to this exemplary embodiment. FIG. 16 is a timing chart for explaining the readout operation of the pixel signal from pixel 2B by solid-state image capturing device 100B in the first exemplary embodiment. Specifically, FIG. 16 shows respective control signals supplied to pixel portion 1B. Note that pieces of timing of the respective control signals supplied to column readout circuit 4B are similar to those of the first exemplary embodiment, and accordingly, are omitted.

Solid-state image capturing device 100B reads out the pixel signal of left pixel 2Ba during a period from time t21 to time t25, and reads out the pixel signal of right pixel 2Bb during a period from time t26 to time t30. A description is made below in detail of operations at each time.

As shown in FIG. 16, at time t21, charge transfer signals (TRANa, TRANb) are L (low), and a pixel reset signal (RST) is H (high), and accordingly, two transfer transistors 11a, 11b are turned off, and reset transistor 13 is turned on. Hence, a potential (hereinafter, Vfd) of FD 12 is initialized to a FD reset potential Vfdrst (=VDD).

Next, at time t22, the charge transfer signals (TRANa, TRANb) are L, and the pixel reset signal (RST) is L, and accordingly, transfer transistors 11a, 11b and reset transistor 13 are turned off. Hence, such a rest state (initialized state) of the potential of FD 12 is held. At this time, the row selection signal (SEL) is H, and accordingly, selection transistor 15 is ON. Hence, amplification transistor 14 and pixel current source transistor 22 compose the source follower circuit, and Vfdrst−Vth is output as the reset voltage to vertical signal line 18. Actually, the reset voltage is represented as Vfdrst−Vth−α; however, α is omitted here.

At time t23, the charge transfer signal (TRANa) is H, and accordingly, transfer transistor 11a of left pixel 2Ba is turned on. Hence, the charges accumulated in PD 10a of left pixel 2Ba are transferred to FD 12, and Vfd is decreased by an amount of voltage Vfdsig corresponding to this signal charge quantity, and then becomes Vfdrst−Vfdsig.

At time t24, the charge transfer signals (TRANa, TRANb) are L, and the row selection signal (SEL) is H, and accordingly, transfer transistors 11a, 11b of both pixels 2Ba, 2Bb are turned off, and selection transistor 15 is turned on. Hence, Vfdrst−Vfdsig−Vth is output as the read voltage to vertical signal line 18. As a result, in column readout circuit 4B, a voltage corresponding to a difference between the reset voltage and the read voltage, that is, the pixel signal of left pixel 2Ba is obtained.

Thereafter, at time t25, this pixel signal is written into the S/H capacitor. Moreover, this pixel signal is subjected to the AD conversion in column ADC 5B, whereby a digital value of the pixel signal of left pixel 2Ba is obtained. That is to say, by the AD conversion operation by column ADC 5B, the pixel signal of left pixel 2Ba is converted from an analog value into a digital value.

As described above, during a period from time t21 to time t25, the signal readout operation and the AD conversion operation for the pixel signal of left pixel 2Ba are performed.

In a similar way, during a period from time t26 to time t30, a digital value of the pixel signal of right pixel 2Bb is obtained. That is to say, during the period from time t26 to time t30, the signal readout operation and the AD conversion operation for the pixel signal of right pixel 2Bb are performed.

By the capturing operation including the signal readout operation and the AD conversion operation for left pixel 2Ba and right pixel 2Bb, which are described as above, solid-state image capturing device 100B in this exemplary embodiment can output the digital pixel signals corresponding to the quantities of received light in respective pixels 2B of pixel portion 1B. A description is made below of an overall operation of solid-state image capturing device 100B of this exemplary embodiment.

In a similar way to the above-described first exemplary embodiment, solid-state image capturing device 100B of this exemplary embodiment includes, as the drive modes: the full scan mode for use in capturing the still image of the camera; and the mixture mode of three pixels arrayed vertically and three pixels arrayed horizontally. The mixture mode is used for the monitor image of the camera.

Specifically, in the full scan mode, solid-state image capturing device 100B reads out the pixel signals of the B/Gr pixels in four rows by two vertical signal lines 18 (one vertical signal line 18 before the division), and by column readout circuits 4B and column ADCs 5B, implements the digital conversion for the readout pixel signals, and outputs the pixel signals without being processed in digital balancers 6B. Next, solid-state image capturing device 100B outputs the pixel signals of the R/Gb pixels in the same four rows by similar processing. By repeating such processing for the whole of pixel portion 1B, solid-state image capturing device 100B can output the pixel signals of all pixels 2B of pixel portion 1B independently of one another. That is to say, a camera or the like, which includes solid-state image capturing device 100B, for example, as a chip, can obtain a full pixel image in a case of driving solid-state image capturing device 100B in the full scan mode.

Meanwhile, in the mixture mode, solid-state image capturing device 100B reads out the pixel signals of the B/Gr pixels in four rows by two vertical signal lines 18 (one vertical signal line 18 before the division), and by column readout circuits 4B and column ADCs 5B, implements the digital conversion for the readout pixel signals, and holds the pixel signals in digital balancers 6B. After repeating this processing three times, solid-state image capturing device 100B averages the vertically arrayed three pixels and the horizontally arrayed three pixels, which are held in digital balancer 6B, and outputs a mixed signal, which is a pixel signal obtained by averaging these pixels, to the outside. Next, solid-state image capturing device 100B performs the readout, the averaging and the output for the pixel signals of the R/Gb pixels in the same four rows.

By repeating such processing for the whole of pixel portion 1B, solid-state image capturing device 100B can mix the pixel signals of all pixels 2B of pixel portion 1B in units of sets of the vertically arrayed three pixels and the horizontally arrayed three pixels, and can output the mixed pixel signals. That is to say, the camera or the like, which includes solid-state image capturing device 100B, for example, as a chip, can obtain a mixed image in a case of driving solid-state image capturing device 100B in the mixture mode.

Next, a description is made of pixel access flows of solid-state image capturing device 100B in respective cases of the full scan mode and the mixture mode with reference to FIG. 17 to FIG. 20.

Figure 17:
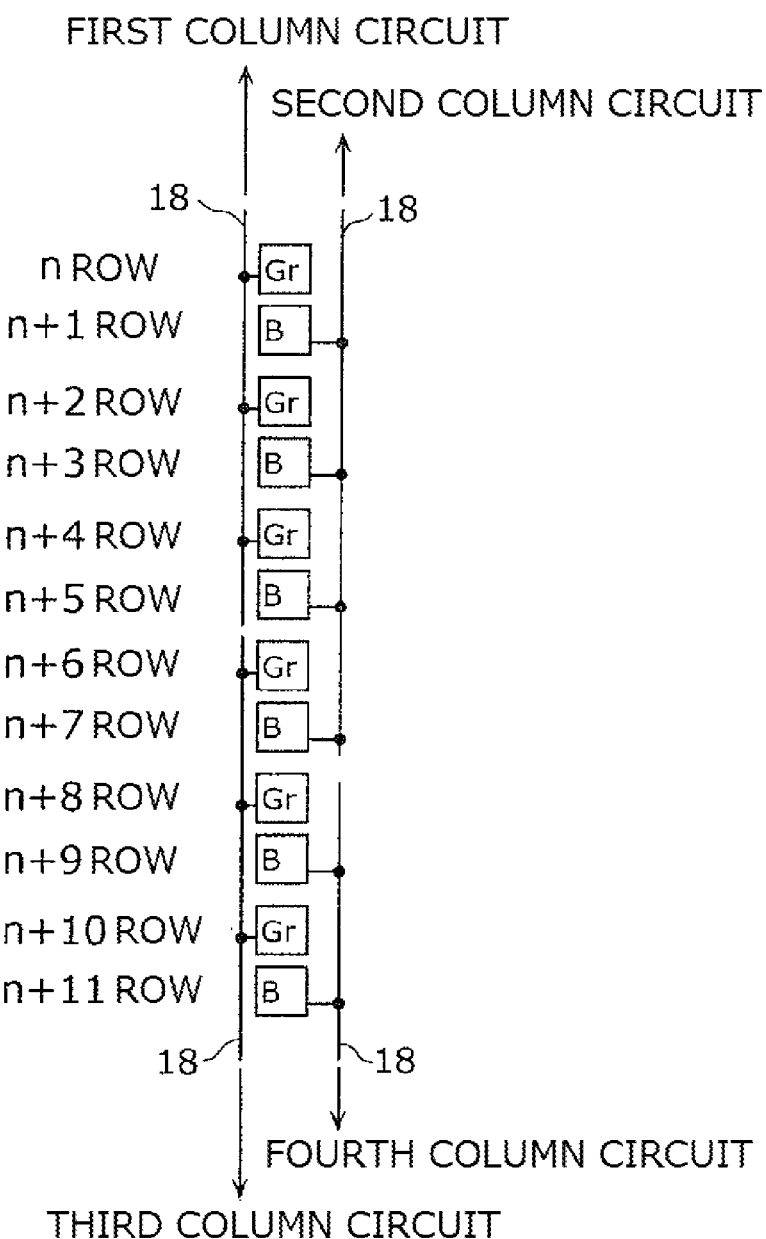
FIG. 17 is a diagram showing connections of the pixels, vertical signal lines, and column readout circuits in one column (Gr/B column) of the pixel portion of the solid-state image capturing device in the third exemplary embodiment.

First, there is considered the full scan mode of reading out pixels 2B equivalent to one column, which is shown in FIG. 17, and in which the Gr/B pixels are arrayed, without mixing pixels 2B concerned. FIG. 17 is a diagram showing connections of pixels 2B, vertical signal lines 18, and column readout circuits 4B in one column (Gr/B column) of pixel portion 1B of solid-state image capturing device 100B in the third exemplary embodiment of the present disclosure. Note that, in FIG. 17, a circuit configuration including the base units of column readout circuits 4B and column ADCs 5B is illustrated as column circuits (first column circuit to fourth column circuit). Moreover, as mentioned above, as the circuit configuration, two pixels 2Ba, 2Bb adjacent to each other in the column direction have one output; however, here, each of pixels 2Ba, 2Bb is illustrated so as to have an output in order to explain the readout in the column in which the Gr/B pixels are arrayed.

Here, in solid-state image capturing device 100B in this exemplary embodiment, one vertical signal line 18 is disposed in each column of pixel portion 1B, and this vertical signal line 18 is divided between the upper region and the lower region of pixel portion 1B. The pixel signals output from the plurality of pixels 2B of each column are read out to the pluralities of column readout circuits 4B and column ADCs 5B through vertical signal line 18 disposed in each column and through vertical signal line 18 adjacent to this column In such a way, in a similar way to the first exemplary embodiment, solid-state image capturing device 100B in this exemplary embodiment can read out the pixel signals of two pixel rows in parallel in each of the upper region and the lower region.

To perform the AD conversion operation after the above-described signal readout operation corresponds to one horizontal (H) period operation. FIG. 18 shows combinations of the circuits and the pixel signals of pixels 2B, in which the pixel signals are read out to the circuits in respective H periods. In odd-number H periods, the Gr/B pixels are read out. In even-number H periods, the R/Gb pixels are read out. FIG. 18 is a table showing accesses of pixels 2B in the respective horizontal periods of the full scan mode of solid-state image capturing device 100B in the third exemplary embodiment of the present disclosure.

As shown in FIG. 18, in each of the H periods, four pixel signals are read out from pixels 2B of each column by using four vertical signal lines (two vertical signal lines 18 before the division) and four column circuits (first column circuit to fourth column circuit). This stands for that a high-speed operation can be realized. That is to say, in the respective H periods, column readout circuits 4B and column ADCs 5B can read out the pixel signals from pixel portion 1B in units of four rows, and can perform the AD conversion for the readout pixel signals. That is to say, solid-state image capturing device 100B becomes capable of the high-speed read out in the full scan mode in a similar way to the first exemplary embodiment.

Figure 19:
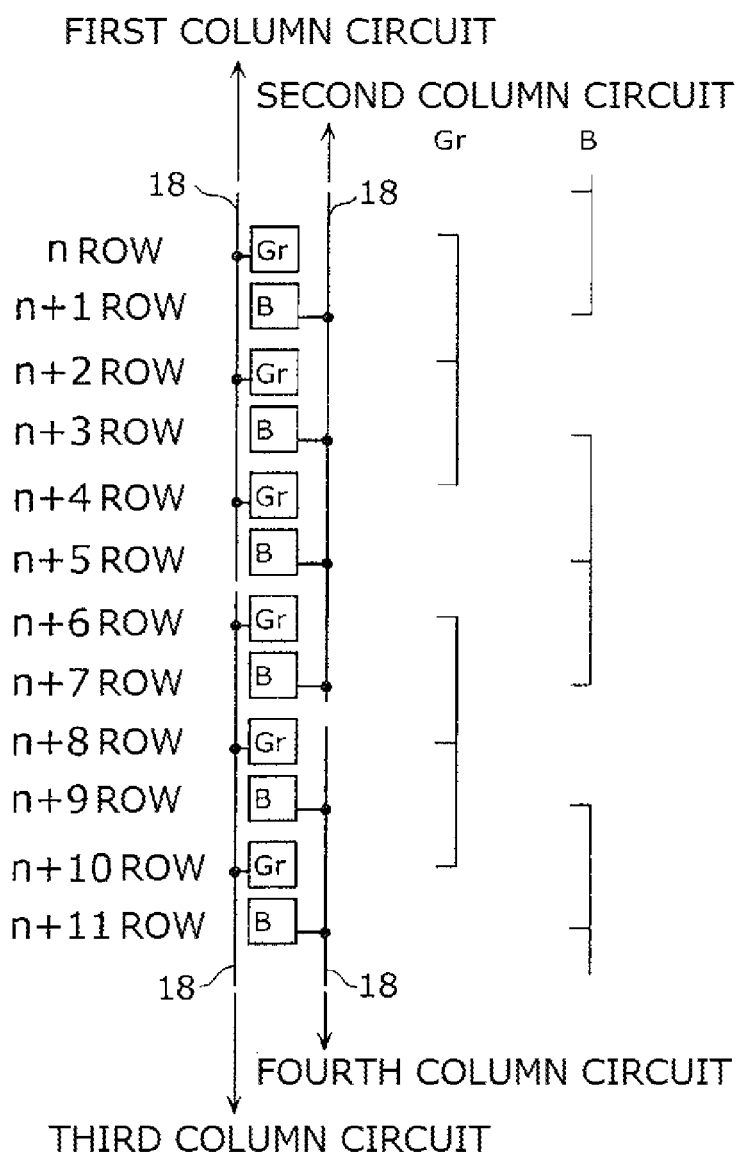
FIG. 19 is a diagram showing connections of the pixels, the vertical signal lines, and the column readout circuits in one column (Gr/B column) of the pixel portion of the solid-state image capturing device and combinations of mixed rows in the mixture mode in the third exemplary embodiment.

Next, there is considered the mixture mode of reading out pixels 2B equivalent to one column while individually mixing vertically arrayed three pixels 2B. FIG. 19 is a diagram showing connections of pixels 2B, vertical signal lines 18 and column readout circuits 4B in one column (Gr/B column) of pixel portion 1B of solid-state image capturing device 100B and combinations of the mixed rows in the mixture mode in the third exemplary embodiment of the present disclosure.

Here, as mentioned above, in solid-state image capturing device 100B in this exemplary embodiment, the pixel signals output from the plurality of pixels 2B of each column are read out to the pluralities of column readout circuits 4B and column ADCs 5B through vertical signal line 18 disposed in each column and through vertical signal line 18 disposed in the column adjacent to this column. In such a way, in a similar way to the first exemplary embodiment, in each of the upper region and the lower region of pixel portion 1B, solid-state image capturing device 100B in this exemplary embodiment can read out the pixel signals of two pixel rows in parallel, and in addition, can implement the mixture of the pixel signals in the upper region and the mixture of the pixel signals in the lower region in parallel. In such a way, solid-state image capturing device 100B becomes capable of the high-speed readout also in the mixture mode in a similar way to the first exemplary embodiment.

In a similar way to the full scan mode, also in the mixture mode, to perform the AD conversion operation after the above-described signal readout operation corresponds to one horizontal (H) period operation. FIG. 20 shows combinations of the circuits and the pixel signals of pixels 2B, in which the pixel signals are read out to the circuits in the respective H periods. FIG. 20 is a table showing accesses of pixels 2B in the respective horizontal periods of the mixture mode of solid-state image capturing device 100B in the third exemplary embodiment of the present disclosure.

As shown in FIG. 20, in each of the H periods, four pixel signals are read out by using four vertical signal lines (two vertical signal lines 18 before the division) and four column circuits (first column circuit to fourth column circuit). Moreover, when three digital pixel signals are obtained, the averaging processing is performed in digital balancers 6B. That is to say, the pixel signals are read out in units of four rows, are subjected to the digital conversion, and are held in digital balancers 6B. This processing is repeated three times, and thereafter, the pixel signals held in digital balancers 6B are averaged. In such a way, the pixel signals of the vertically arrayed three pixels are mixed with one another. Note that "A+B+C" in a field of "mixture" in FIG. 20 represents an average of A, B and C. For example, "(n+4) row+(n+2) row+n row" represent an average of an output of an (n+4)-th row, an output of an (n+2)-th row, and an output of an n-th row. As a matter of course, the average processing may be replaced by addition processing.

In 3H periods after performing the readout and mixture of the pixel signals for the Gr/B pixels, solid-state image capturing device 100B performs the readout and mixture of the pixel signals for the R/Gb pixels.

Here, centers of gravity of the mixed signals which are pixel signals obtained by being averaged by digital balancer 6B become as follows by a fact that the division position of vertical signal line 18 disposed in each column and the division position of vertical signal line 18 disposed in the column adjacent to this column are shifted from each other by two rows. That is to say, in the pixel column in which the Gr pixels and the B pixels are arrayed, centers of gravity of the mixed signals of the plurality of Gr pixels and centers of gravity of the mixed signals of the plurality of B pixels are arrayed at an equal pitch. In a similar way, also in the pixel column in which the R pixels and the Gb pixels are arrayed, centers of gravity of the mixed signals of the plurality of Gr pixels and centers of gravity of the mixed signals of the plurality of B pixels are arrayed at an equal pitch.

In such a way, in a similar way to the first exemplary embodiment, the mixed image that is an image generated by using the mixed signals output from solid-state image capturing device 100B according to this exemplary embodiment becomes a high-quality image in which the moire is suppressed. That is to say, in a similar way to solid-state image capturing device 100 according to the first exemplary embodiment, solid-state image capturing device 100B according to this exemplary embodiment becomes capable of capturing the monitor image with high image quality.

Note that, in this exemplary embodiment, solid-state image capturing device 100B includes column readout circuits 4B which have a clamp function; however, in the solid-state image capturing device according to the present disclosure, column readout circuits 4B may be omitted, and vertical signal lines 18 may be directly connected to column ADCs 5B. That is to say, in this exemplary embodiment, column ADCs 5B read out the pixel signals, which are output from pixel portion 1B, through column readout circuits 4B; however, may read out the pixel signals, which are output from pixel portion 1B, not through column readout circuits 4B.

As described above, in accordance with solid-state image capturing device 100B according to this exemplary embodiment, in a similar way to the above-described first exemplary embodiment, in each column of pixel portion 1B, one vertical signal line 18 is disposed, and vertical signal line 18 is divided between the upper region and the lower region of pixel portion 1B. The pixel signals output from the plurality of pixels 2B of each column are read out to the plurality of column ADCs 5B through two vertical signal lines 18 including one vertical signal line 18 disposed in each column. The division position of one of vertical signal lines 18 and the division position of the other vertical signal line 18 are different from each other in the row direction.

In such a way, solid-state image capturing device 100B according to this exemplary embodiment can exert a similar effect to that of the above-described first exemplary embodiment.

Specifically, two pixels 2Ba, 2Bb adjacent to each other in the column direction share selection transistor 15 for outputting the pixel signal. The pixel signals output from the plurality of pixels 2B of each column are further read out through one vertical signal line 18 disposed in the column adjacent to that column. The division position of one vertical signal line 18 disposed in each column and the division position of one vertical signal line 18 disposed in the column adjacent to that column are different from each other in the row direction.

That is to say, two pixels 2Ba, 2Bb adjacent to each other in the column direction have one output. In such a way, a number of peripheral circuits of pixel portion 1B can be reduced. Hence, solid-state image capturing device 100B can be downsized. Moreover, two pixels 2B adjacent to each other in the column direction share the transistors, whereby solid-state image capturing device 100B according to this exemplary embodiment can increase the area of the photodiode more than solid-state image capturing device 100 according to the first exemplary embodiment. Hence, sensitivity can be enhanced.

More specifically, in each column of pixel portion 1B, one vertical signal line 18 shared by this column and the column adjacent to this column is disposed, and the division positions of two vertical signal lines 18 disposed in the columns adjacent to each other are different from each other in the row direction.

As described above, in this exemplary embodiment, a number of the base units of each of column readout circuits 4B, column ADCs 5B, and digital balancers 6B is one per column, which is a half of the number of the base units in the first exemplary embodiment. As described above, the peripheral circuits (column readout circuits 4B, column ADCs 5B, and digital balancers 6B) of pixel portion 1B can be halved. Accordingly, a chip size can be reduced, and there is an advantage that inexpensive solid-state image capturing device 100B can be realized.

Note that, in this exemplary embodiment, in each column of pixel portion 1B, one vertical signal line 18 is disposed; however, two or more vertical signal lines may be disposed. Moreover, in this exemplary embodiment, two pixels 2Ba, 2Bb adjacent to each other in the column direction share reset transistor 13, amplification transistor 14, and selection transistor 15; however, do not have to share reset transistor 13 and amplification transistor 14.

That is to say, two pixels 2Ba, 2Bb adjacent to each other in the column direction may share selection transistor 15. The pixel signals output from the plurality of pixels 2B of each column may be further read out through one or more vertical signal lines disposed in the column and through one or more vertical signal lines disposed in the column adjacent to that column. The division position of one or more vertical signal lines disposed in each column and the division position of one or more vertical signal lines disposed in the column adjacent to that column may be different from each other in the row direction.

Even such a solid-state image capturing device configured as described above can exert a similar effect to that of this exemplary embodiment by a fact that two pixels 2Ba, 2Bb adjacent to each other in the column direction have one output.

The description has been made above of the solid-state image capturing device of the present disclosure based on the above-described exemplary embodiments. However, the solid-state image capturing device of the present disclosure is not limited to the above-described exemplary embodiments. Other exemplary embodiments, which are realized by combining arbitrary constituents in the above-described exemplary embodiments with one another, modification examples, which are obtained by implementing various modifications conceivable by those skilled in the art for the above-described exemplary embodiments within the scope without departing from the spirit of the present disclosure, and various instruments, which include the solid-state image capturing device of the present disclosure, are also incorporated in the present disclosure.

For example, in the above-described exemplary embodiments, the division positions of the vertical signal lines are located between one pixel row (for example, (n+5) row) and the other pixel row (for example, (n+6) row), which are adjacent to each other; however, the division positions are not limited to the above, and may be located in an inside of the one pixel row or in an inside of the other pixel row. That is to say, the division positions of the vertical signal lines just need to be such positions where the pixel signal output from the one pixel row and the pixel signal output from the other pixel row are not allowed to be output to the same vertical signal line after the division.

Moreover, in the above-described exemplary embodiments, the description has been made of such an example where each of the transistors is an NMOS transistor; however, each transistor may be a PMOS transistor.

Moreover, in the above-described exemplary embodiments, the description has been made of such an example where the column readout circuit does not include an amplification circuit; however, the column readout circuit may include an amplification circuit.

the solid-state image capturing device according to the present disclosure is useful as an image sensor intended for a capturing instrument such as a single-lens reflex digital camera and a high-grade compact digital camera, for which high image quality and high-speed capturing are required.

What is claimed is:

1. A solid-state image capturing device comprising:
   a pixel portion in which a plurality of pixels outputting pixel signals corresponding to quantities of received light are arrayed in a matrix in a horizontal row direction and a vertical column direction; and
   a plurality of column readout circuits which are disposed in an upper part and a lower part of a periphery of the pixel portion and read out the pixel signals output from the pixel portion,
   wherein one or more vertical signal lines extending in the vertical column direction are disposed along one of columns of the pixel portion, and each of the vertical signal lines is electrically separated by a division gap into two parts between an upper region and a lower region aligned with the upper region in the vertical column direction,
   the pixel signals output from the plurality of pixels of the one of the columns are read out to the plurality of column readout circuits through two or more parts of the vertical signal lines including the two parts of the one or more vertical signal lines disposed along the one of the columns, and
   a division gap of one vertical signal line among the vertical signal lines disposed in the pixel portion and a division gap of another vertical signal line among the vertical signal lines are located at different rows.

2. The solid-state image capturing device according to claim 1, wherein:
   the one or more vertical signal lines are two or more vertical signal lines extending in the vertical column direction disposed along the one of the columns of the pixel portion,
   the pixel signals output from the plurality of pixels of the one of the columns are read out to the plurality of column readout circuits through the two or more parts of the vertical signal lines disposed along the one of the columns, and
   a division gap of one vertical signal line among the two or more vertical signal lines disposed along the one of the columns and a division gap of another vertical signal line among the two or more vertical signal lines disposed along the one of the columns are located at different rows.

3. The solid-state image capturing device according to claim 2, wherein:
   a plurality of vertical signal line sets extending in the vertical column direction are disposed along the one of the columns of the pixel portion, each of the plurality of vertical signal line sets being composed of a plurality of the vertical signal lines in which division gaps are located at different rows with each other, and
   the pixel signals output from the plurality of pixels of the one of the columns are read out to the plurality of column readout circuits through the plurality of vertical signal line sets disposed along the one of the columns.

4. The solid-state image capturing device according to claim 1, wherein:
two pixels adjacent to each other in the vertical column direction share a selection transistor for outputting the pixel signals,
the pixel signals output from the plurality of pixels of the one of the columns are read out through one or more vertical signal lines disposed along another column adjacent to the one of the columns, and
a division gap of the one or more vertical signal lines disposed along the one of the columns and a division gap of the one or more vertical signal lines disposed along the another column adjacent to the one of the columns are located at different rows.

5. The solid-state image capturing device according to claim 4, wherein:
one vertical signal line of the vertical signal lines shared by the one of the columns and the another column adjacent to the one of the columns is disposed along the one of the columns in the pixel portion, and
a division gap of the one vertical signal line disposed along the one of the columns and a division gap of another vertical signal line along the another column adjacent to the one of the columns are located at different rows.

6. The solid-state image capturing device according to claim 1,
wherein the solid-state image capturing device has a full scan mode that is a drive mode of reading out the pixel signals of all of the pixels independently of one another, and a mixture mode that is a drive mode of mixing and reading out a plurality of the pixel signals output from the plurality of pixels.

7. The solid-state image capturing device according to claim 6, wherein:
in the pixel portion, red pixels, blue pixels, and green pixels are arranged in a Bayer matrix, red pixels outputting the pixel signals based on red light, blue pixels outputting the pixel signals based on blue light, and green pixels outputting the pixel signals based on green light, and
the vertical signal lines are separated at positions corresponding to a positional relationship between centers of gravity of already mixed pixel signals output from a plurality of rows including the red pixels and centers of gravity of the already mixed pixel signals output from a plurality of rows including the blue pixels.

8. The solid-state image capturing device according to claim 7,
wherein the vertical signal lines are separated at positions where the centers of gravity of the already mixed pixel signals output from the plurality of rows including the red pixels and the centers of gravity of the already mixed pixel signals output from the plurality of rows including the blue pixels are located at an equal pitch.

9. A solid-state image capturing device comprising:
a pixel portion in which a plurality of pixels outputting pixel signals corresponding to quantities of received light are arrayed in a matrix; and
a plurality of column readout circuits which are disposed in an upper part and a lower part of a periphery of the pixel portion and read out the pixel signals output from the pixel portion, wherein:
one or more vertical signal lines are disposed along one of columns of the pixel portion, and each of the vertical signal lines is electrically divided into two parts between an upper region and a lower region of the pixel portion,
the pixel signals output from the plurality of pixels of the one of the columns are read out to the plurality of column readout circuits through two or more parts of the vertical signal lines including the two parts of the one or more vertical signal lines disposed along the one of the columns,
a division position of one vertical signal line among the vertical signal lines disposed in the pixel portion is different from a division position of another vertical signal line among the vertical signal lines in a row direction,
two pixels adjacent to each other in a column direction share a selection transistor for outputting the pixel signals,
the pixel signals output from the plurality of pixels of the one of the columns are read out through one or more vertical signal lines disposed along another column adjacent to the one of the columns, and
a division position of the one or more vertical signal lines disposed along the one of the columns is different from a division position of the one or more vertical signal lines disposed along the another column adjacent to the one of the columns in the row direction.

10. The solid-state image capturing device according to claim 9, wherein:
one vertical signal line of the vertical signal lines shared by the one of the columns and the another column adjacent to the one of the columns is disposed along the one of the columns in the pixel portion, and
a division position of the one vertical signal line disposed along the one of the columns is different from a division position of another vertical signal line along the another column adjacent to the one of the columns in the row direction.

11. A solid-state image capturing device comprising:
a pixel portion in which a plurality of pixels outputting pixel signals corresponding to quantities of received light are arrayed in a matrix; and
a plurality of column readout circuits which are disposed in an upper part and a lower part of a periphery of the pixel portion and read out the pixel signals output from the pixel portion, wherein:
one or more vertical signal lines are disposed along one of columns of the pixel portion, and each of the vertical signal lines is electrically divided into two parts between an upper region and a lower region of the pixel portion,
the pixel signals output from the plurality of pixels of the one of the columns are read out to the plurality of column readout circuits through two or more parts of the vertical signal lines including the two parts of the one or more vertical signal lines disposed along the one of the columns,
a division position of one vertical signal line among the vertical signal lines disposed in the pixel portion is different from a division position of another vertical signal line among the vertical signal lines in a row direction,
the solid-state image capturing device has a full scan mode that is a drive mode of reading out the pixel signals of all of the pixels independently of one another, and a mixture mode that is a drive mode of mixing and reading out a plurality of the pixel signals output from the plurality of pixels, in the pixel portion, red pixels, blue pixels, and green pixels are arranged in a Bayer matrix, red pixels outputting the pixel signals based on red light, blue pixels outputting the pixel signals based on blue light, and green pixels outputting the pixel signals based on green light, and the vertical signal lines are divided at positions corresponding to a positional relationship between centers of gravity of already mixed pixel signals output from a plurality of rows including the red pixels and centers of gravity of the already mixed pixel signals output from a plurality of rows including the blue pixels.

12. The solid-state image capturing device according to claim 11, wherein the vertical signal lines are divided at positions where the centers of gravity of the already mixed pixel signals output from the plurality of rows including the red pixels and the centers of gravity of the already mixed pixel signals output from the plurality of rows including the blue pixels are located at an equal pitch.

* * * * *